United States Patent
Jiang et al.

(10) Patent No.: US 10,198,785 B2
(45) Date of Patent: Feb. 5, 2019

(54) GRAPHICS PROCESSING METHOD, APPARATUS, AND SYSTEM

(71) Applicant: Huawei Technologies Co., Ltd., Shenzhen (CN)

(72) Inventors: Xiaotang Jiang, Shenzhen (CN); Zhenkun Zhou, Hangzhou (CN); Yunxi Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/719,073

(22) Filed: Sep. 28, 2017

(65) Prior Publication Data

US 2018/0018751 A1 Jan. 18, 2018

Related U.S. Application Data

(63) Continuation of application No. PCT/CN2015/094969, filed on Nov. 19, 2015.

(30) Foreign Application Priority Data

Apr. 2, 2015 (CN) .......................... 2015 1 0154809

(51) Int. Cl.
*G06T 1/20* (2006.01)
*G06F 9/445* (2018.01)
(Continued)

(52) U.S. Cl.
CPC ............ *G06T 1/20* (2013.01); *G06F 9/44505* (2013.01); *G06T 11/206* (2013.01); *G06T 11/40* (2013.01); *G06T 11/60* (2013.01)

(58) Field of Classification Search
CPC . G06T 1/20; G06T 11/60; G06T 11/40; G06T 11/206; G06T 11/00; G06T 16/005;
(Continued)

(56) References Cited

U.S. PATENT DOCUMENTS 5,422,729 A * 6/1995 Yoshida ................ G06K 15/02
347/5
8,379,019 B2 2/2013 Barczak et al.
(Continued)

FOREIGN PATENT DOCUMENTS

CN 1773494 A 5/2006
CN 101499172 A 8/2009
(Continued)

OTHER PUBLICATIONS

Foreign Communication From a Counterpart Application, European Application No. 15887283.8, Extended European Search Report dated Feb. 9, 2018, 6 pages.
(Continued)

*Primary Examiner* — William A Beutel
(74) *Attorney, Agent, or Firm* — Conley Rose, P.C.

(57) ABSTRACT

A graphics processing method, apparatus, and system are presented. The method includes receiving a command queue input by a current frame which includes multiple drawing commands; splitting each irregular drawing command into at least one first-class drawing command and at least one second-class drawing command; grouping, into multiple drawing command sets, a regular drawing command in the multiple drawing commands, and the first-class drawing command and the second-class drawing command that are obtained after the splitting, so that drawing commands that belong to different drawing command sets do not intersect with each other; separately performing intersection detection on the multiple drawing command sets; separately performing drawing command combining on the multiple drawing command sets on which the intersection detection is performed; and executing a drawing command obtained after combining is performed on each drawing command set.

14 Claims, 17 Drawing Sheets

(51) Int. Cl.
*G06T 11/20* (2006.01)
*G06T 11/40* (2006.01)
*G06T 11/60* (2006.01)

(58) Field of Classification Search
CPC ... G06T 15/503; G06F 9/44505; G06F 3/048; G06K 15/02
See application file for complete search history.

(56) References Cited

U.S. PATENT DOCUMENTS

| | | | |
|---|---|---|---|
| 8,739,028 B2* | 5/2014 | Lynton | G06F 17/30056 358/1.18 |
| 9,779,533 B2* | 10/2017 | Dimitrov | G06T 15/005 |
| 2004/0177089 A1* | 9/2004 | Love | G06F 17/30271 |
| 2009/0244628 A1 | 10/2009 | Tsugimura | |
| 2010/0322527 A1 | 12/2010 | Fablet et al. | |
| 2013/0135322 A1 | 5/2013 | Seetharamaiah et al. | |
| 2013/0328922 A1* | 12/2013 | Belanger | G06T 11/00 345/629 |
| 2014/0327686 A1 | 11/2014 | Jia | |

FOREIGN PATENT DOCUMENTS

| CN | 101702244 A | 5/2010 |
|---|---|---|
| CN | 102736898 A | 10/2012 |
| CN | 103164839 A | 6/2013 |
| CN | 103677828 A | 3/2014 |
| CN | 103959338 A | 7/2014 |
| CN | 104809684 A | 7/2015 |
| EP | 1385125 A1 | 1/2004 |
| EP | 1528512 A2 | 5/2005 |

OTHER PUBLICATIONS

Machine Translation and Abstract of Chinese Publication No. CN1773494, May 17, 2006, 7 pages.
Machine Translation and Abstract of Chinese Publication No. CN101499172, Aug. 5, 2009, 13 pages.
Machine Translation and Abstract of Chinese Publication No. CN103677828, Mar. 26, 2014, 30 pages.
Machine Translation and Abstract of Chinese Publication No. CN101702244, May 5, 2010, 26 pages.
Machine Translation and Abstract of Chinese Publication No. CN102736898, Oct. 17, 2012, 14 pages.
Machine Translation and Abstract of Chinese Publication No. CN104809684, Jul. 29, 2015, 73 pages.
Foreign Communication From a Counterpart Application, Chinese Application No. 2015101548094, Chinese Search Report dated May 8, 2017, 2 pages.
Foreign Communication From a Counterpart Application, Chinese Application No. 2015101548094, Chinese Office fiction dated May 17, 2017, 4 pages.
Foreign Communication From a Counterpart Application, PCT Application No. PCT/CN2015/094969, English Translation of International Search Report dated Feb. 2, 2016, 2 pages.
Foreign Communication From a Counterpart Application, PCT Application No. PCT/CN2015/094969, English Translation of Written Opinion dated Feb. 2, 2016, 7 pages.

\* cited by examiner

GRAPHICS PROCESSING METHOD, APPARATUS, AND SYSTEM

CROSS-REFERENCE TO RELATED APPLICATIONS

This application is a continuation of International Application No. PCT/CN2015/094969, filed on Nov. 19, 2015, which claims priority to Chinese Patent Application No. 201510154809.4, filed on Apr. 2, 2015, both of which are hereby incorporated by reference in their entireties.

TECHNICAL FIELD

Embodiments of the present disclosure relate to the field of image processing, and in particular, to a graphics processing method, apparatus, and system.

BACKGROUND

A graphics engine is a graphics library formed by performing encapsulation on graphics operations for ease of application development, and is provided by a system or designed by a developer. Each time an interface changes (starting, sliding, redirection, animation play, or the like), the graphics engine needs to draw an appropriate interface completely. When the graphics engine draws, a large quantity of Central Processing Unit (CPU), Graphics Processing Unit (GPU), and Double Data Rate (DDR) synchronous dynamic random access memory resources need to be consumed according to a quantity of pixels. In an ideal case, a quantity of pixels drawn by the graphics engine each time is a product of a width and a height of a screen; the quantity of pixels may exceed the product of the width and the height of the screen. Overdraw refers to a case in which a same pixel is repeatedly drawn.

In an existing method for eliminating overdraw, methods of intersection detection and drawing command combining are used during drawing, so as to eliminate overdraw.

However, in the existing method for eliminating overdraw, an irregular graph such as a rectangle rotated by any angle, a triangle, or an ellipse cannot be drawn, and time complexity of intersection detection is high. In many cases of drawing a graph, gains of eliminating overdraw are offset.

SUMMARY

Embodiments of the present disclosure provide a graphics processing method, apparatus, and system, which can reduce complexity of intersection detection, and eliminate overdraw to some extent.

According to a first aspect, a graphics processing method is provided, and the method includes receiving a command queue input by a current frame, where the command queue includes multiple drawing commands, each drawing command carries bounding rectangle information, execution content, a drawing mode, and drawing area information, and the drawing mode includes an opaque mode, a blend mode, or a wait mode; splitting, according to the bounding rectangle information and the drawing area information, each irregular drawing command in the multiple drawing commands into at least one first-class drawing command and at least one second-class drawing command, where a drawing area of the at least one first-class drawing command is a rectangle in a drawing area corresponding to the irregular drawing command, a drawing area of the at least one second-class drawing command is a remaining corner area obtained after the drawing area of the at least one first-class drawing command is subtracted from the drawing area corresponding to the irregular drawing command, a drawing mode of the at least one first-class drawing command is the same as a drawing mode of the irregular drawing command, and a drawing mode of the at least one second-class drawing command is the wait mode; grouping, into multiple drawing command sets according to the bounding rectangle information and the drawing area information, a regular drawing command in the multiple drawing commands, and the at least one first-class drawing command and the at least one second-class drawing command that are obtained after the irregular drawing command in the multiple drawing commands is split, so that drawing commands that belong to different drawing command sets do not intersect with each other; separately performing intersection detection on the multiple drawing command sets according to the bounding rectangle information and the drawing area information, so that drawing commands in each drawing command set in the multiple drawing command sets do not intersect with each other; separately performing, according to the execution content, the drawing mode, and the drawing area information, drawing command combining on the multiple drawing command sets on which the intersection detection is performed; and executing a drawing command obtained after combining is performed on each drawing command set.

With reference to the first aspect, in a first possible implementation manner, the splitting, according to the bounding rectangle information and the drawing area information, each irregular drawing command in the multiple drawing commands into at least one first-class drawing command and at least one second-class drawing command is implemented as follows: acquiring maximum inscribed rectangle information of the irregular drawing command according to bounding rectangle information and drawing area information of the irregular drawing command; and splitting the irregular drawing command into the one first-class drawing command and the at least one second-class drawing command using the bounding rectangle information and the maximum inscribed rectangle information of the irregular drawing command, where the drawing area corresponding to the first-class drawing command is a maximum inscribed rectangle corresponding to the irregular drawing command, and the drawing area corresponding to the at least one second-class drawing command is a corner area obtained after the maximum inscribed rectangle is subtracted from the drawing area corresponding to the irregular drawing command.

With reference to the first aspect, in a second possible implementation manner, the splitting, according to the bounding rectangle information and the drawing area information, each irregular drawing command in the multiple drawing commands into at least one first-class drawing command and at least one second-class drawing command is implemented as follows: when the drawing area corresponding to the irregular drawing command is an irregular polygon, segmenting a drawing area of the irregular polygon into multiple triangular drawing areas, and splitting the irregular drawing command into multiple third-class drawing commands according to a segmentation method of the irregular polygon, where the multiple third-class drawing commands are in one-to-one correspondence with the multiple triangular drawing areas; for each third-class drawing command, acquiring maximum inscribed rectangle information of the third-class drawing command according to bounding rectangle information and drawing area information of the third-class drawing command; and splitting the third-class drawing command into the one first-class drawing command and the at least one second-class drawing command using the bounding rectangle information and the maximum inscribed rectangle information of the third-class drawing command, where the drawing area corresponding to the first-class drawing command is a maximum inscribed rectangle corresponding to the third-class drawing command, and the drawing area corresponding to the at least one second-class drawing command is a corner area obtained after the maximum inscribed rectangle is subtracted from a drawing area corresponding to the third-class drawing command.

According to a second aspect, a graphics processing method is provided, and the method includes receiving a command queue input by a current frame, where the command queue includes multiple application programming interface (API) commands; converting the multiple API commands to multiple drawing commands, where each drawing command carries bounding rectangle information, execution content, a drawing mode, and drawing area information, and the drawing mode includes an opaque mode, a blend mode, or a wait mode; splitting, according to the bounding rectangle information and the drawing area information, each irregular drawing command in the multiple drawing commands into at least one first-class drawing command and at least one second-class drawing command, where a drawing area of the at least one first-class drawing command is a rectangle in a drawing area corresponding to the irregular drawing command, a drawing area of the at least one second-class drawing command is a remaining corner area obtained after the drawing area of the at least one first-class drawing command is subtracted from the drawing area corresponding to the irregular drawing command, a drawing mode of the at least one first-class drawing command is the same as a drawing mode of the irregular drawing command, and a drawing mode of the at least one second-class drawing command is the wait mode; grouping, into multiple drawing command sets according to the bounding rectangle information and the drawing area information, a regular drawing command in the multiple drawing commands, and the at least one first-class drawing command and the at least one second-class drawing command that are obtained after the irregular drawing command in the multiple drawing commands is split, so that drawing commands that belong to different drawing command sets do not intersect with each other; separately performing intersection detection on the multiple drawing command sets according to the bounding rectangle information and the drawing area information, so that drawing commands in each drawing command set in the multiple drawing command sets do not intersect with each other; separately performing, according to the execution content, the drawing mode, and the drawing area information, drawing command combining on the multiple drawing command sets on which the intersection detection is performed; and executing a drawing command obtained after combining is performed on each drawing command set.

With reference to the second aspect, in a first possible implementation manner, the splitting, according to the bounding rectangle information and the drawing area information, each irregular drawing command in the multiple drawing commands into at least one first-class drawing command and at least one second-class drawing command is implemented as follows: acquiring maximum inscribed rectangle information of the irregular drawing command according to bounding rectangle information and drawing area information of the irregular drawing command; and splitting the irregular drawing command into the one first-class drawing command and the at least one second-class drawing command using the bounding rectangle information and the maximum inscribed rectangle information of the irregular drawing command, where the drawing area corresponding to the first-class drawing command is a maximum inscribed rectangle corresponding to the irregular drawing command, and the drawing area corresponding to the at least one second-class drawing command is a corner area obtained after the maximum inscribed rectangle is subtracted from the drawing area corresponding to the irregular drawing command.

With reference to the second aspect, in a second possible implementation manner, the splitting, according to the bounding rectangle information and the drawing area information, each irregular drawing command in the multiple drawing commands into at least one first-class drawing command and at least one second-class drawing command is implemented as follows: when the drawing area corresponding to the irregular drawing command is an irregular polygon, segmenting a drawing area of the irregular polygon into multiple triangular drawing areas, and splitting the irregular drawing command into multiple third-class drawing commands according to a segmentation method of the irregular polygon, where a drawing area corresponding to each third-class drawing command is one of the multiple triangular drawing areas; for each third-class drawing command, acquiring maximum inscribed rectangle information of the third-class drawing command according to bounding rectangle information and drawing area information of the third-class drawing command; and splitting the third-class drawing command into the one first-class drawing command and the at least one second-class drawing command using the bounding rectangle information and the maximum inscribed rectangle information of the third-class drawing command, where the drawing area corresponding to the first-class drawing command is a maximum inscribed rectangle corresponding to the third-class drawing command, and the drawing area corresponding to the at least one second-class drawing command is a corner area obtained after the maximum inscribed rectangle is subtracted from a drawing area corresponding to the third-class drawing command.

According to a third aspect, a graphics processing apparatus is provided, and the graphics processing apparatus includes a command collection module configured to receive a command queue input by a current frame, where the command queue includes multiple drawing commands, each drawing command carries bounding rectangle information, execution content, a drawing mode, and drawing area information, and the drawing mode includes an opaque mode, a blend mode, or a wait mode; a command splitting module configured to split, according to the bounding rectangle information and the drawing area information, each irregular drawing command in the multiple drawing commands into at least one first-class drawing command and at least one second-class drawing command, where a drawing area of the at least one first-class drawing command is a rectangle in a drawing area corresponding to the irregular drawing command, a drawing area of the at least one second-class drawing command is a remaining corner area obtained after the drawing area of the at least one first-class drawing command is subtracted from the drawing area corresponding to the irregular drawing command, a drawing mode of the at least one first-class drawing command is the same as a drawing mode of the irregular drawing command, and a drawing mode of the at least one second-class drawing command is the wait mode; a command grouping module configured to group, into multiple drawing command sets according to the bounding rectangle information and the drawing area information, a regular drawing command in the multiple drawing commands, and the at least one first-class drawing command and the at least one second-class drawing command that are obtained after the irregular drawing command in the multiple drawing commands is split, so that drawing commands that belong to different drawing command sets do not intersect with each other; an intersection detection module configured to separately perform intersection detection on the multiple drawing command sets according to the bounding rectangle information and the drawing area information, so that drawing commands in each drawing command set in the multiple drawing command sets do not intersect with each other; a command combining module configured to separately perform, according to the execution content, the drawing mode, and the drawing area information, drawing command combining on the multiple drawing command sets on which the intersection detection is performed; and an execution module configured to execute a drawing command obtained after combining is performed on each drawing command set.

With reference to the third aspect, in a first possible implementation manner, the command splitting module is configured to acquire maximum inscribed rectangle information of the irregular drawing command according to bounding rectangle information and drawing area information of the irregular drawing command; and split the irregular drawing command into the one first-class drawing command and the at least one second-class drawing command using the bounding rectangle information and the maximum inscribed rectangle information of the irregular drawing command, where the drawing area corresponding to the first-class drawing command is a maximum inscribed rectangle corresponding to the irregular drawing command, and the drawing area corresponding to the at least one second-class drawing command is a corner area obtained after the maximum inscribed rectangle is subtracted from the drawing area corresponding to the irregular drawing command.

With reference to the third aspect, in a second possible implementation manner, the command splitting module is configured to, when the drawing area corresponding to the irregular drawing command is an irregular polygon, segment a drawing area of the irregular polygon into multiple triangular drawing areas, and split the irregular drawing command into multiple third-class drawing commands according to a segmentation method of the irregular polygon, where the multiple third-class drawing commands are in one-to-one correspondence with the multiple triangular drawing areas; for each third-class drawing command, acquire maximum inscribed rectangle information of the third-class drawing command according to bounding rectangle information and drawing area information of the third-class drawing command; and split the third-class drawing command into the one first-class drawing command and the at least one second-class drawing command using the bounding rectangle information and the maximum inscribed rectangle information of the third-class drawing command, where the drawing area corresponding to the first-class drawing command is a maximum inscribed rectangle corresponding to the third-class drawing command, and the drawing area corresponding to the at least one second-class drawing command is a corner area obtained after the maximum inscribed rectangle is subtracted from a drawing area corresponding to the third-class drawing command.

According to a fourth aspect, a graphics processing apparatus is provided, and the graphics processing apparatus includes a command collection module configured to receive a command queue input by a current frame, where the command queue includes multiple API commands; a command conversion module configured to convert the multiple API commands to multiple drawing commands, where each drawing command carries bounding rectangle information, execution content, a drawing mode, and drawing area information, and the drawing mode includes an opaque mode, a blend mode, or a wait mode; a command splitting module configured to split, according to the bounding rectangle information and the drawing area information, each irregular drawing command in the multiple drawing commands into at least one first-class drawing command and at least one second-class drawing command, where a drawing area of the at least one first-class drawing command is a rectangle in a drawing area corresponding to the irregular drawing command, a drawing area of the at least one second-class drawing command is a remaining corner area obtained after the drawing area of the at least one first-class drawing command is subtracted from the drawing area corresponding to the irregular drawing command, a drawing mode of the at least one first-class drawing command is the same as a drawing mode of the irregular drawing command, and a drawing mode of the at least one second-class drawing command is the wait mode; a command grouping module configured to group, into multiple drawing command sets according to the bounding rectangle information and the drawing area information, a regular drawing command in the multiple drawing commands, and the at least one first-class drawing command and the at least one second-class drawing command that are obtained after the irregular drawing command in the multiple drawing commands is split, so that drawing commands that belong to different drawing command sets do not intersect with each other; an intersection detection module configured to separately perform intersection detection on the multiple drawing command sets according to the bounding rectangle information and the drawing area information, so that drawing commands in each drawing command set in the multiple drawing command sets do not intersect with each other; a command combining module configured to separately perform, according to the execution content, the drawing mode, and the drawing area information, drawing command combining on the multiple drawing command sets on which the intersection detection is performed; and an execution module configured to execute a drawing command obtained after combining is performed on each drawing command set.

With reference to the fourth aspect, in a first possible implementation manner, the command splitting module is configured to acquire maximum inscribed rectangle information of the irregular drawing command according to bounding rectangle information and drawing area information of the irregular drawing command; and split the irregular drawing command into the one first-class drawing command and the at least one second-class drawing command using the bounding rectangle information and the maximum inscribed rectangle information of the irregular drawing command, where the drawing area corresponding to the first-class drawing command is a maximum inscribed rectangle corresponding to the irregular drawing command, and the drawing area corresponding to the at least one second-class drawing command is a corner area obtained after the maximum inscribed rectangle is subtracted from the drawing area corresponding to the irregular drawing command.

With reference to the fourth aspect, in a second possible implementation manner, the command splitting module is configured to, when the drawing area corresponding to the irregular drawing command is an irregular polygon, segment a drawing area of the irregular polygon into multiple triangular drawing areas, and split the irregular drawing command into multiple third-class drawing commands according to a segmentation method of the irregular polygon, where the multiple third-class drawing commands are in one-to-one correspondence with the multiple triangular drawing areas; for each third-class drawing command, acquire maximum inscribed rectangle information of the third-class drawing command according to bounding rectangle information and drawing area information of the third-class drawing command; and split the third-class drawing command into the one first-class drawing command and the at least one second-class drawing command using the bounding rectangle information and the maximum inscribed rectangle information of the third-class drawing command, where the drawing area corresponding to the first-class drawing command is a maximum inscribed rectangle corresponding to the third-class drawing command, and the drawing area corresponding to the at least one second-class drawing command is a corner area obtained after the maximum inscribed rectangle is subtracted from a drawing area corresponding to the third-class drawing command.

According to a fifth aspect, a computer system is provided, and the computer system includes a processor and a storage, where the storage is configured to store a program; and the processor is configured to execute the program stored in the storage and is configured to perform the following operations: receiving a command queue input by a current frame, where the command queue includes multiple drawing commands, each drawing command carries bounding rectangle information, execution content, a drawing mode, and drawing area information, and the drawing mode includes an opaque mode, a blend mode, or a wait mode; splitting, according to the bounding rectangle information and the drawing area information, each irregular drawing command in the multiple drawing commands into at least one first-class drawing command and at least one second-class drawing command, where a drawing area of the at least one first-class drawing command is a rectangle in a drawing area corresponding to the irregular drawing command, a drawing area of the at least one second-class drawing command is a remaining corner area obtained after the drawing area of the at least one first-class drawing command is subtracted from the drawing area corresponding to the irregular drawing command, a drawing mode of the at least one first-class drawing command is the same as a drawing mode of the irregular drawing command, and a drawing mode of the at least one second-class drawing command is the wait mode; grouping, into multiple drawing command sets according to the bounding rectangle information and the drawing area information, a regular drawing command in the multiple drawing commands, and the at least one first-class drawing command and the at least one second-class drawing command that are obtained after the irregular drawing command in the multiple drawing commands is split, so that drawing commands that belong to different drawing command sets do not intersect with each other; separately performing intersection detection on the multiple drawing command sets according to the bounding rectangle information and the drawing area information, so that drawing commands in each drawing command set in the multiple drawing command sets do not intersect with each other; separately performing, according to the execution content, the drawing mode, and the drawing area information, drawing command combining on the multiple drawing command sets on which the intersection detection is performed; and executing a drawing command obtained after combining is performed on each drawing command set.

With reference to the fifth aspect, in a first possible implementation manner, in a process of splitting, according to the bounding rectangle information and the drawing area information, each irregular drawing command in the multiple drawing commands into at least one first-class drawing command and at least one second-class drawing command, the processor is configured to acquire maximum inscribed rectangle information of the irregular drawing command according to bounding rectangle information and drawing area information of the irregular drawing command; and split the irregular drawing command into the one first-class drawing command and the at least one second-class drawing command using the bounding rectangle information and the maximum inscribed rectangle information of the irregular drawing command, where the drawing area corresponding to the first-class drawing command is a maximum inscribed rectangle corresponding to the irregular drawing command, and the drawing area corresponding to the at least one second-class drawing command is a corner area obtained after the maximum inscribed rectangle is subtracted from the drawing area corresponding to the irregular drawing command.

With reference to the fifth aspect, in a second possible implementation manner, in a process of splitting, according to the bounding rectangle information and the drawing area information, each irregular drawing command in the multiple drawing commands into at least one first-class drawing command and at least one second-class drawing command, the processor is configured to, when the drawing area corresponding to the irregular drawing command is an irregular polygon, segment a drawing area of the irregular polygon into multiple triangular drawing areas, and split the irregular drawing command into multiple third-class drawing commands according to a segmentation method of the irregular polygon, where the multiple third-class drawing commands are in one-to-one correspondence with the multiple triangular drawing areas; for each third-class drawing command, acquire maximum inscribed rectangle information of the third-class drawing command according to bounding rectangle information and drawing area information of the third-class drawing command; and split the third-class drawing command into the one first-class drawing command and the at least one second-class drawing command using the bounding rectangle information and the maximum inscribed rectangle information of the third-class drawing command, where the drawing area corresponding to the first-class drawing command is a maximum inscribed rectangle corresponding to the third-class drawing command, and the drawing area corresponding to the at least one second-class drawing command is a corner area obtained after the maximum inscribed rectangle is subtracted from a drawing area corresponding to the third-class drawing command.

According to a sixth aspect, a computer system is provided, and the computer system includes a processor and a storage, where the storage is configured to store a program; and the processor is configured to execute the program stored in the storage and is configured to perform the following operations: receiving a command queue input by a current frame, where the command queue includes multiple API commands; converting the multiple API commands to multiple drawing commands, where each drawing command carries bounding rectangle information, execution content, a drawing mode, and drawing area information, and the drawing mode includes an opaque mode, a blend mode, or a wait mode; splitting, according to the bounding rectangle information and the drawing area information, each irregular drawing command in the multiple drawing commands into at least one first-class drawing command and at least one second-class drawing command, where a drawing area of the at least one first-class drawing command is a rectangle in a drawing area corresponding to the irregular drawing command, a drawing area of the at least one second-class drawing command is a remaining corner area obtained after the drawing area of the at least one first-class drawing command is subtracted from the drawing area corresponding to the irregular drawing command, a drawing mode of the at least one first-class drawing command is the same as a drawing mode of the irregular drawing command, and a drawing mode of the at least one second-class drawing command is the wait mode; grouping, into multiple drawing command sets according to the bounding rectangle information and the drawing area information, a regular drawing command in the multiple drawing commands, and the at least one first-class drawing command and the at least one second-class drawing command that are obtained after the irregular drawing command in the multiple drawing commands is split, so that drawing commands that belong to different drawing command sets do not intersect with each other; separately performing intersection detection on the multiple drawing command sets according to the bounding rectangle information and the drawing area information, so that drawing commands in each drawing command set in the multiple drawing command sets do not intersect with each other; separately performing, according to the execution content, the drawing mode, and the drawing area information, drawing command combining on the multiple drawing command sets on which the intersection detection is performed; and executing a drawing command obtained after combining is performed on each drawing command set.

With reference to the sixth aspect, in a first possible implementation manner, in a process of splitting, according to the bounding rectangle information and the drawing area information, each irregular drawing command in the multiple drawing commands into at least one first-class drawing command and at least one second-class drawing command, the processor is configured to acquire maximum inscribed rectangle information of the irregular drawing command according to bounding rectangle information and drawing area information of the irregular drawing command; and split the irregular drawing command into the one first-class drawing command and the at least one second-class drawing command using the bounding rectangle information and the maximum inscribed rectangle information of the irregular drawing command, where the drawing area corresponding to the first-class drawing command is a maximum inscribed rectangle corresponding to the irregular drawing command, and the drawing area corresponding to the at least one second-class drawing command is a corner area obtained after the maximum inscribed rectangle is subtracted from the drawing area corresponding to the irregular drawing command.

With reference to the sixth aspect, in a second possible implementation manner, in a process of splitting, according to the bounding rectangle information and the drawing area information, each irregular drawing command in the multiple drawing commands into at least one first-class drawing command and at least one second-class drawing command, the processor is configured to, when the drawing area corresponding to the irregular drawing command is an irregular polygon, segment a drawing area of the irregular polygon into multiple triangular drawing areas, and split the irregular drawing command into multiple third-class drawing commands according to a segmentation method of the irregular polygon, where the multiple third-class drawing commands are in one-to-one correspondence with the multiple triangular drawing areas; for each third-class drawing command, acquire maximum inscribed rectangle information of the third-class drawing command according to bounding rectangle information and drawing area information of the third-class drawing command; and split the third-class drawing command into the one first-class drawing command and the at least one second-class drawing command using the bounding rectangle information and the maximum inscribed rectangle information of the third-class drawing command, where the drawing area corresponding to the first-class drawing command is a maximum inscribed rectangle corresponding to the third-class drawing command, and the drawing area corresponding to the at least one second-class drawing command is a corner area obtained after the maximum inscribed rectangle is subtracted from a drawing area corresponding to the third-class drawing command.

According to a seventh aspect, a graphics display system is provided, and the graphics display system includes the graphics processing apparatus according to the third aspect, the first possible implementation manner of the third aspect, or the second possible implementation manner of the third aspect; and a graphics display apparatus, communicatively connected to the graphics processing apparatus and configured to display a graph obtained after the graphics processing apparatus executes a combined drawing command.

According to an eighth aspect, a graphics display system is provided, and the graphics display system includes the graphics processing apparatus according to the fourth aspect, the first possible implementation manner of the fourth aspect, or the second possible implementation manner of the fourth aspect; and a graphics display apparatus, communicatively connected to the graphics processing apparatus and configured to display a graph obtained after the graphics processing apparatus executes a combined drawing command.

On the one hand, according to the graphics processing method, apparatus, and system that are provided in the embodiments of the present disclosure, an irregular drawing command in a command queue of a current frame is split into a regular drawing command and an irregular drawing command according to a drawing area; a regular drawing command that exists before the splitting and the regular drawing command and irregular drawing command that are obtained after the splitting are grouped into multiple drawing command sets that do not intersect with each other; and then intersection detection and command combining are separately performed on each drawing command set. Drawing commands are grouped into multiple drawing command sets, and then intersection detection is performed, which can greatly reduce a time for intersection detection. In addition, original irregular drawing commands are split into regular drawing commands and irregular drawing commands, several new regular drawing commands are obtained after intersection detection is performed on the regular drawing commands that are obtained after the splitting, and one or more of the several new regular drawing commands may be combined in a command combining operation, which can improve an effect of overdraw elimination to some extent. Therefore, graphics processing performance can be improved.

On the other hand, according to the graphics processing method, apparatus, and system that are provided in the embodiments of the present disclosure, multiple API commands in a command queue of a current frame are converted into multiple drawing commands; an irregular drawing command in the multiple drawing commands is split into a regular drawing command and an irregular drawing command according to a drawing area; a regular drawing command that exists before the splitting and the regular drawing command and irregular drawing command that are obtained after the splitting are grouped into multiple drawing command sets that do not intersect with each other; and then intersection detection and command combining are separately performed on each drawing command set. Drawing commands are grouped into multiple drawing command sets, and then intersection detection is performed, which can greatly reduce a time for intersection detection. In addition, original irregular drawing commands are split into regular drawing commands and irregular drawing commands, several new regular drawing commands are obtained after intersection detection is performed on the regular drawing commands that are obtained after the splitting, and one or more of the several new regular drawing commands may be combined in a command combining operation, which can improve an effect of overdraw elimination to some extent. Therefore, graphics processing performance can be improved.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
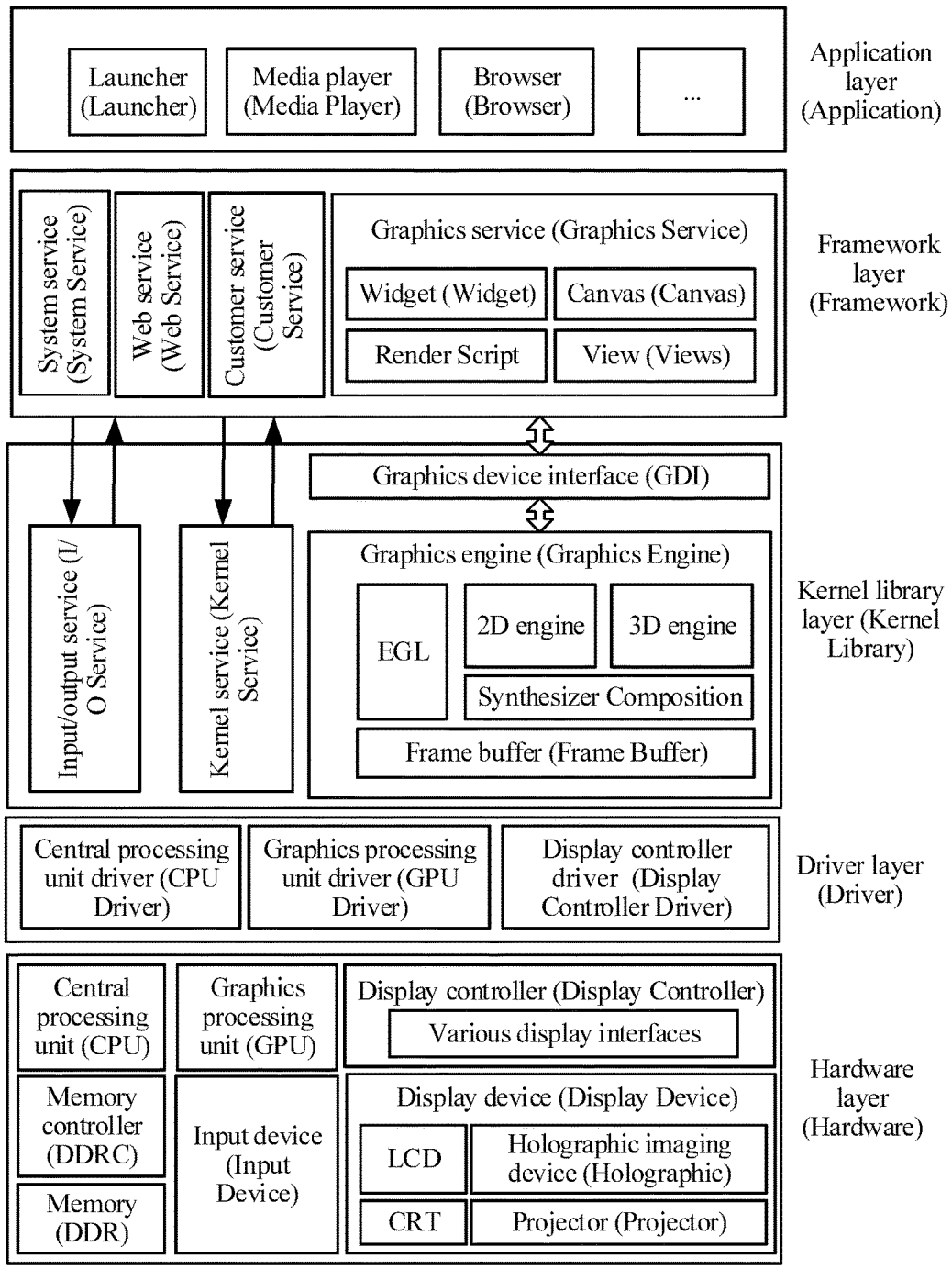
FIG. 1 is a schematic diagram of a logical architecture of a terminal device.

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

A terminal may be referred to as user equipment (UE), a user, or the like, and may communicate with one or more core networks through a radio access network (RAN). The terminal may be a mobile terminal, such as a mobile phone ("cellular" phone) and a computer with a mobile terminal. For example, the terminal may be a portable, pocket-sized, handheld, computer built-in, or in-vehicle mobile apparatus, which exchanges voices and/or data with the radio access network.

To help understand the embodiments of the present disclosure, the following describes several elements that will be used in descriptions in the embodiments of the present disclosure.

Maximum inscribed rectangle: If four vertexes are on edges of a graph, and a formed rectangle is inside the graph, the rectangle is referred to as an inscribed rectangle of the graph. When an area of the inscribed rectangle is the largest, the inscribed rectangle is referred to as the maximum inscribed rectangle. The maximum inscribed rectangle in this embodiment of the present disclosure needs to meet the following condition: It is assumed that an edge of a desktop of a terminal is A, two parallel edges of the maximum inscribed rectangle are in parallel with the edge A, and the other two parallel edges are perpendicular to the edge A.

Drawing command: a graphics rendering command used for a graphics engine to a display desktop of a terminal. Generally, the drawing command may include four types of information: Rect, Work, Mode, and Shape. Rect represents bounding rectangle information of a drawing area corresponding to the drawing command. Work represents execution content of the drawing command. Mode represents a drawing mode of the drawing command, that is, a blend mode of drawing results on a canvas, which includes three types: opaque, blend, and wait. Shape describes an area shape of the drawing command, such as a rectangle/round/point/line, and the area shape of the drawing command is the drawing area of the drawing command.

FIG. 1 is a schematic structural diagram of a terminal device.

FIG. 1 is used as an example to describe a logical structure of a computing node to which a graphics processing method provided in an embodiment of the present disclosure is applied. The computing node may be a terminal device, and the terminal device may be a smartphone. As shown in FIG. 1, a hardware layer of the terminal device includes a CPU, a GPU, and the like, and certainly, may further include a storage, an input/output device, a memory, a memory controller, a network interface, and the like, where the input device may include a keyboard, a mouse, a touchscreen, and the like, and the output device may include a display device such as a liquid crystal display (LCD), a cathode ray tube (CRT), a holographic imaging device (Holographic), and a projector. An operating system (such as Android) and some application programs may run at the hardware layer. A kernel library is a kernel part of the operating system, and includes an input/output service, a kernel service, a graphics device interface, a graphics engine that is used to implement graphics processing performed by a CPU or a GPU, and the like. The graphics engine may include a two-dimensional (2D) engine, a three-dimensional (3D) engine, a synthesizer, a frame buffer, an EGL, and the like. In addition, the terminal device further includes a driver layer, a framework layer, and an application layer. The driver layer may include a CPU driver, a GPU driver, a display controller driver, and the like. The framework layer may include a graphics service, a system service, a web service, a customer service, and the like. In the graphics service, a widget, a canvas, a view, a Render Script, and the like may be included. The application layer may include a launcher, a media player, a browser, and the like.

The method in this embodiment of the present disclosure may be executed by a 2D engine at a kernel library layer shown in FIG. 1.

As shown in FIG. 1, the graphics processing method provided in this embodiment of the present disclosure is applied to a computing node, and the computing node may be a terminal device, where a hardware layer of the terminal device may include hardware such as a processor (such as a CPU) and a GPU, a display controller, a memory, a memory controller, an input device, and a display device, and a kernel library layer (Kernel Library) may include an input/output service (I/O Service), a kernel service, and a graphics engine. It should be noted that, for a logical structure of an execution body of the method in this embodiment of the present disclosure, reference may be made to FIG. 1.

In an existing method for eliminating overdraw, a method for intersection detection and command combining is used during drawing to eliminate overdraw, and algorithm ideas of an intersection detection algorithm and a command combining algorithm are shown as follows.

Intersection Detection Algorithm:

Input: a series of drawing commands that carry drawing area information in a drawing partition Output: non-intersecting drawing areas that carry a series of drawing commands.

Figure 2:
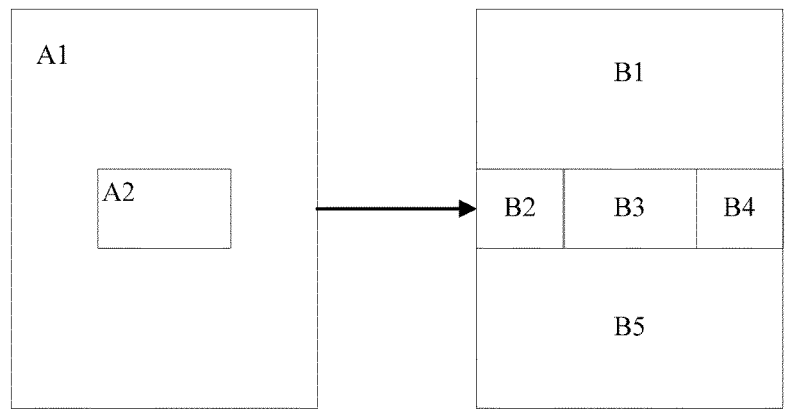
FIG. 2 is a schematic diagram of an intersection detection method according to an embodiment of the present disclosure.

Steps: 1. Put all drawing areas into an area pool. 2. Start to check a first drawing area A. 3. Detect whether A intersects with another drawing area in the area pool. 4. If no intersection exists, process a next drawing area. 5. If a drawing area B in the area pool intersects with the drawing area A, figure out an intersection area C of A and B, where commands of A and B are aggregated in C, and divide A and B into a series of sub-areas according to C; and delete A and B from the area pool, and add C and the sub-areas to the area pool. FIG. 2 is a schematic diagram of an intersection detection method according to an embodiment of the present disclosure. As shown in the left figure of FIG. 2, a drawing area A1 (a larger rectangle area) intersects with a drawing area A2 (a smaller rectangle area), and an intersection area is B3 (which is actually A2). In this case, as shown in the right figure of FIGS. 2, A1 and A2 may be divided into B1, B2, B3, B4, and B5 according to the intersection area B3. 6. Traverse the area pool until all areas in the area pool are traversed.

It should be noted that, in intersection detection, a drawing partition is a relatively large area range. When a drawing area of a drawing command is within an area covered by the drawing partition, the drawing command is referred to as a drawing command in the drawing partition.

In addition, that two drawing areas do not intersect with each other indicates that there is no overlapped area between the two drawing areas. That two drawing commands do not intersect with each other indicates that there is no overlapped area between drawing areas of the two drawing commands. Similarly, that multiple drawing areas do not intersect with each other indicates that there is no overlapped area between the multiple drawing areas, and that multiple drawing commands do not intersect with each other indicates that there is no overlapped area between drawing areas of the multiple drawing commands.

Command Combining Algorithm:

Input: a drawing area that includes a series of drawing commands

Output: a drawing area that includes a series of drawing commands

Steps: 1. Sort all drawing commands in the drawing area by depth. 2. Sequentially perform command combining starting from a second command: if an identifier of a current command is wait, do not perform processing; if an identifier of a current command is opaque, delete all commands preceding the current command; if an identifier of a current command is blend, and an identifier of a previous command is Wait, do not perform processing; if an identifier of a current command is blend, and work of a previous command cannot blend with Work of the current command, do not perform processing; or if an identifier of a current command is blend, an identifier of a previous command is not Wait, and Work of the previous command can blend with Work of the current command, combine the current command and the previous command into one command.

It should be understood that, in a drawing command, Work represents execution content of the drawing command, for example, image sampling.

Figure 3:
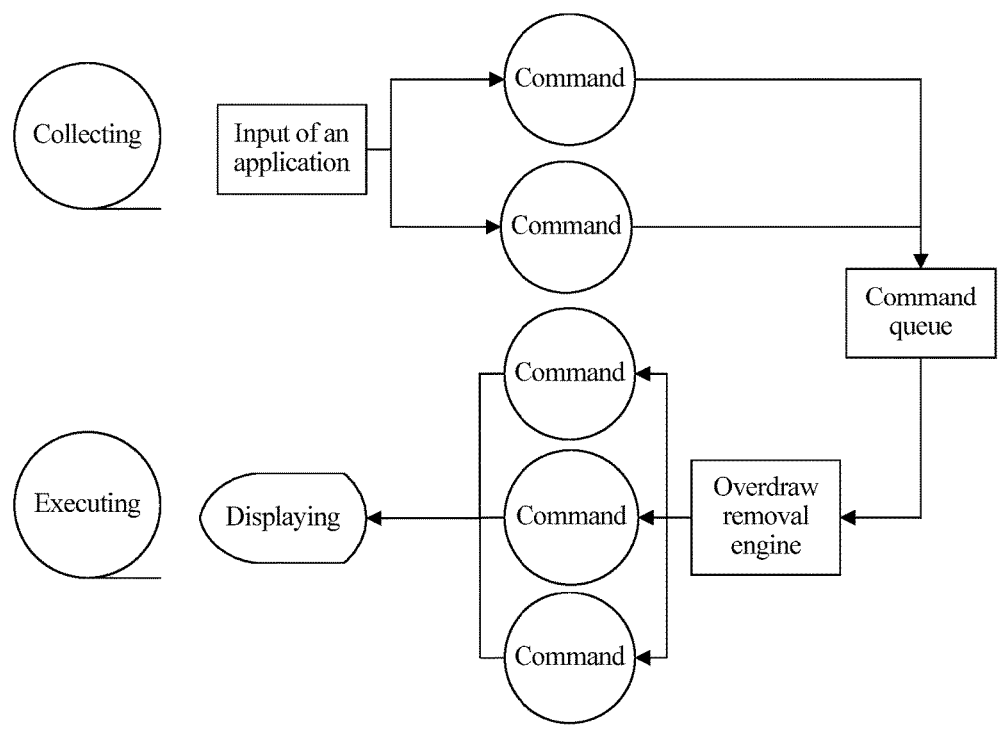
FIG. 3 is a schematic diagram of an disclosure principle according to an embodiment of the present disclosure.

FIG. 3 is a schematic diagram of an disclosure principle according to an embodiment of the present disclosure. As shown in FIG. 3, the method in this embodiment of the present disclosure may be divided into a collection stage and an execution stage. In the collection stage, a set of commands that are input by an application into a same frame are collected into an original command queue. In the execution stage, overdraw removal processing is performed on the original command queue using an overdraw removal engine, to form a new set of commands, and then the new set of commands are output to a display device. Compared with deferred rendering, although both the deferred rendering and the method in this embodiment of the present disclosure are divided into two processes, that is, collection and execution, the following differences exist: (1) except that render targets of all commands are the same, other resources are independent of each other; (2) no instruction that changes only a state exists, all commands generate an actual rendering effect, and each command has its independent state.

Figure 4:
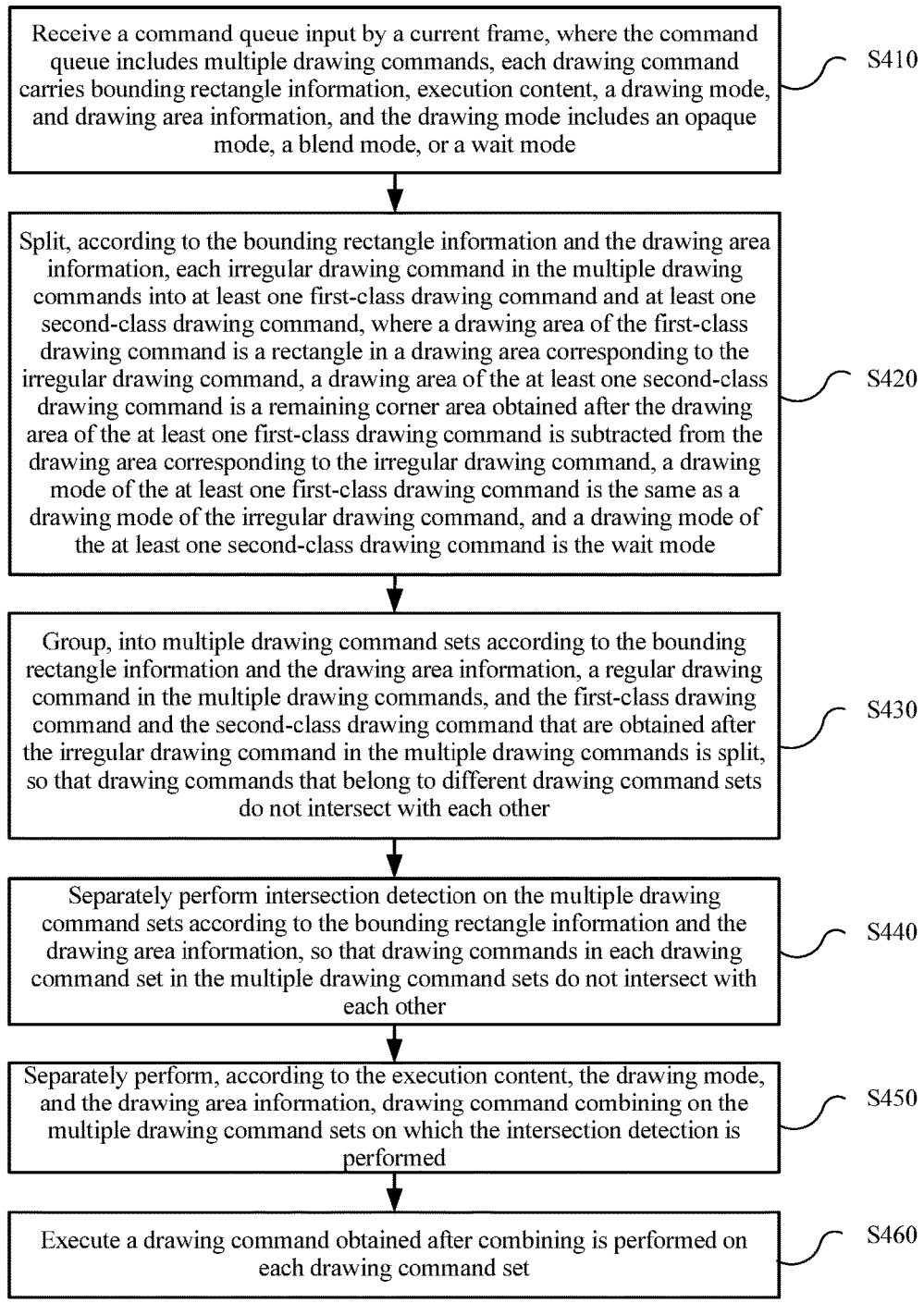
FIG. 4 is a schematic flowchart of a graphics processing method according to an embodiment of the present disclosure.

FIG. 4 is a schematic flowchart of a graphics processing method according to an embodiment of the present disclosure. The method of FIG. 4 is executed by a graphics processing apparatus. The graphics processing apparatus may be a computer system such as a graphics engine, or a graphics processing unit such as a GPU chip. As shown in FIG. 4, the method includes the following steps.

S410. Receive a command queue input by a current frame.

The command queue includes multiple drawing commands, each drawing command carries bounding rectangle information, execution content, a drawing mode, and drawing area information, and the drawing mode includes an opaque mode, a blend mode, or a wait mode.

A drawing command may generally include four types of information: bounding rectangle information (Rect), execution content (Work), a drawing mode (Mode), and a drawing area (Shape).

Rect represents bounding rectangle information of a drawing area corresponding to the drawing command, and the drawing area is located in a bounding rectangle, and in an embodiment, the bounding rectangle of the drawing area is a minimum bounding rectangle whose edges are in parallel with a coordinate axis; Work represents execution content of the drawing command; Mode represents a drawing mode of the drawing command, that is, a blend mode of drawing results on a canvas, which includes three types: opaque, blend, and wait; Shape describes an area shape of the drawing command, such as a rectangle/round/point/line, and the area shape of the drawing command is the drawing area of the drawing command.

In a specific example of a drawing command, an ellipse image is covered to an area of [20, 20] to [300, 400], and a parametric equation of the ellipse is $[((x-160)/140)]^2+[((y-210)/190)]^2=1$. Content of the drawing command may include:

a bounding rectangle: [20, 20] to [300, 300]
execution content: image sampling
a drawing mode: opaque
an area shape: a parametric equation of the ellipse, which is $[((x-160)/140)]^2+[((y-210)/190)]^2=1$ S420. Split, according to bounding rectangle information and drawing area information, each irregular drawing command in multiple drawing commands into at least one first-class drawing command and at least one second-class drawing command.

A drawing area of the at least one first-class drawing command is a rectangle in a drawing area corresponding to the irregular drawing command, a drawing area of the at least one second-class drawing command is a remaining corner area obtained after the drawing area of the at least one first-class drawing command is subtracted from the drawing area corresponding to the irregular drawing command, a drawing mode of the at least one first-class drawing command is the same as a drawing mode of the irregular drawing command, and a drawing mode of the at least one second-class drawing command is the wait mode.

It should be noted that, in this embodiment of the present disclosure, a regular shape refers to a rectangle whose edges are in parallel with edges corresponding to a display desktop. Generally, a display area of a display desktop is a rectangle, and it is assumed that the display area is a rectangle ABCD. It is assumed that a rectangle EFGH is located in the rectangle ABCD, an edge EF is in parallel with an edge AB, and an edge FG is in parallel with an edge BC; then the rectangle EFGH may be considered as an area of a regular shape.

All shapes except the regular shape are referred to as irregular shapes. A drawing command corresponding to a drawing area of a regular shape may be referred to as a regular command; and a drawing command corresponding to a drawing area of an irregular shape may be referred to as an irregular command.

It should be understood that, after a drawing command is split, drawing content of the drawing command is correspondingly reflected in drawing commands that are obtained after the splitting. For example, in the foregoing example, execution content of a drawing command is image sampling, and after the drawing command is split, execution content of drawing commands that are obtained after the splitting is also image sampling, that is, separately performing image sampling on drawing areas of the drawing commands.

In this embodiment of the present disclosure, for a regular command, command splitting processing does not need to be performed, and for an irregular command, command splitting processing needs to be performed.

Figure 5:
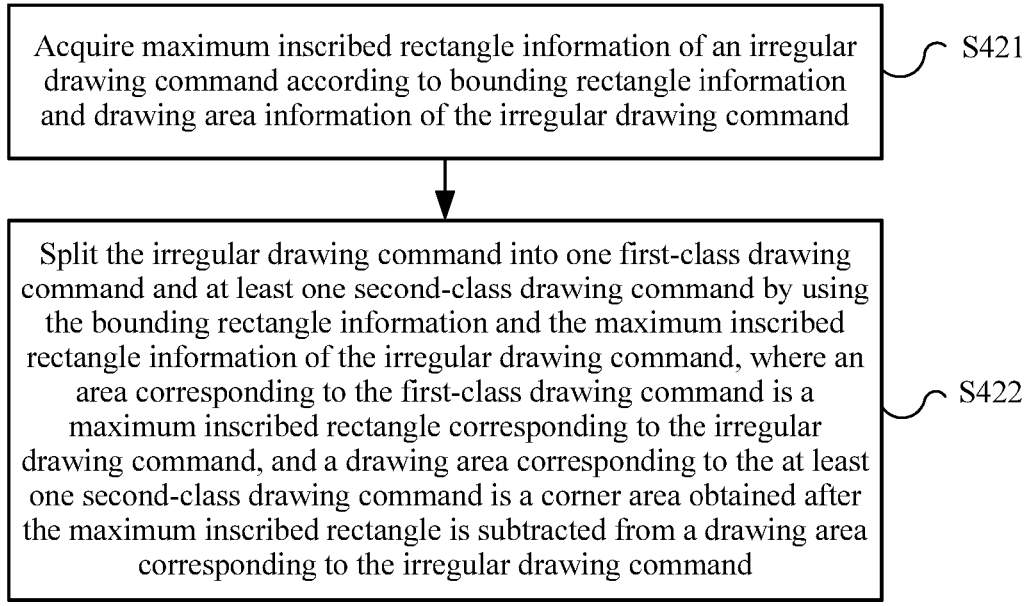
FIG. 5 is a schematic flowchart of a command splitting method according to an embodiment of the present disclosure.

Optionally, in an embodiment, an irregular drawing command may be split into one first-class drawing command and at least one second-class drawing command. A specific command splitting method is shown in FIG. 5, and may include the following steps.

S421. Acquire maximum inscribed rectangle information of the irregular drawing command according to bounding rectangle information and drawing area information of the irregular drawing command.

In this embodiment of the present disclosure, a maximum inscribed rectangle of the irregular drawing command refers to a regular-shape rectangle whose area is the largest in inscribed rectangles of a drawing area corresponding to the irregular drawing command, where the regular-shape rectangle refers to the foregoing described rectangle whose edges are in parallel with edges corresponding to a display desktop.

The following uses several common irregular graphs as examples to figure out maximum inscribed rectangles of the graphs.

Figure 6:
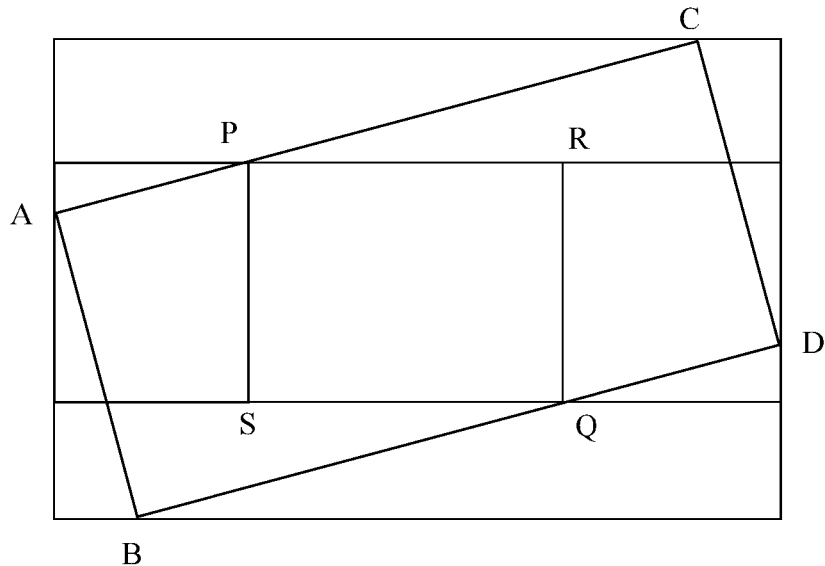
FIG. 6 is a schematic diagram of figuring out a maximum inscribed rectangle in a rectangle rotated by any angle.
Figure 7:
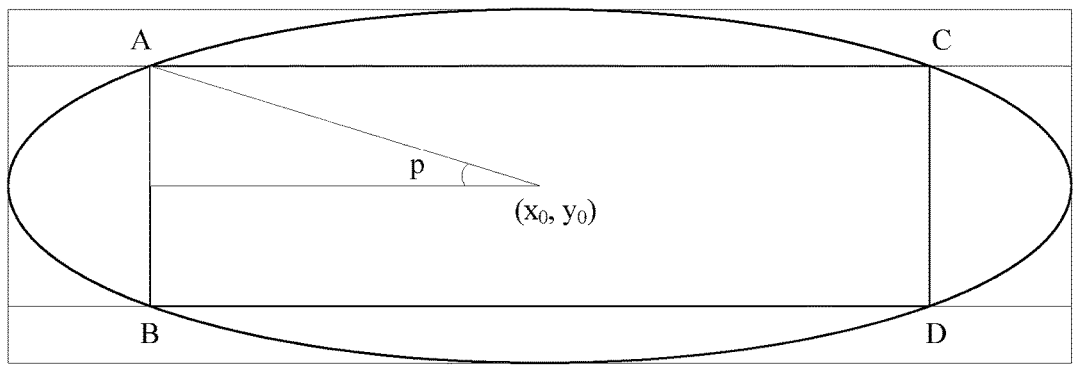
FIG. 7 is a schematic diagram of figuring out a maximum inscribed rectangle in an ellipse.

FIG. 6 is a schematic diagram of figuring out a maximum inscribed rectangle in a rectangle rotated by any angle. As shown in FIG. 6, a rectangle ABCD is a rotated rectangle, and a rectangle PSQR is an inscribed rectangle of the rotated rectangle ABCD. In four vertexes of the rotated rectangle ABCD, coordinates of a point A are (0, 0), coordinates of a point B are (x2, y2), and coordinates of a point C are (x1, y1); P is an intersection point of the inscribed rectangle PSQR and a long edge AC, and Q is an intersection point of the inscribed rectangle PSQR and a long edge BD. A value of AP/AC is denoted as p, and a value of BQ/BD is denoted as q; then a solving equation for a maximum inscribed rectangle can be obtained:

$0.0 \leq p \leq 1.0;$ $0.0 \leq q \leq 1.0;$ $\max:((2-q)x2+(1-p-q)x1)*((2-q)y2+(1-p-q)y1).$ FIG. 7 is a schematic diagram of figuring out a maximum inscribed rectangle in an ellipse. As shown in FIG. 7, it is assumed that a center point of an ellipse is $(x_0, y_0)$, a parametric equation of the ellipse is $[((x-x_0)/a)]^2+[((y-y_0)/b)]^2=1$, a distance between the center point of the ellipse and coordinates of an intersection point (A, B, C, or D) of an inscribed rectangle and the ellipse is r, and an angle is p. A parametric equation of a rectangle ABCD is listed as follows:

$(x_0-x_0, y-y_0)=(a*\cos(p), b*\sin(p));$ and a bounding rectangle of the ellipse is $(x_0-a, y_0-b)$ to $(x_0+a, y_0+b)$.

p is derived according to a function of p and an area, and it can be learned that, when p is equal to 45 degrees, a maximum inscribed rectangle is obtained and may be represented as:

$(x_0-a*\cos(45°), y_0-b*\sin(45°))$ To $(x_0+a*\cos(45°), y_0+b*\sin(45°)).$

Figure 8:
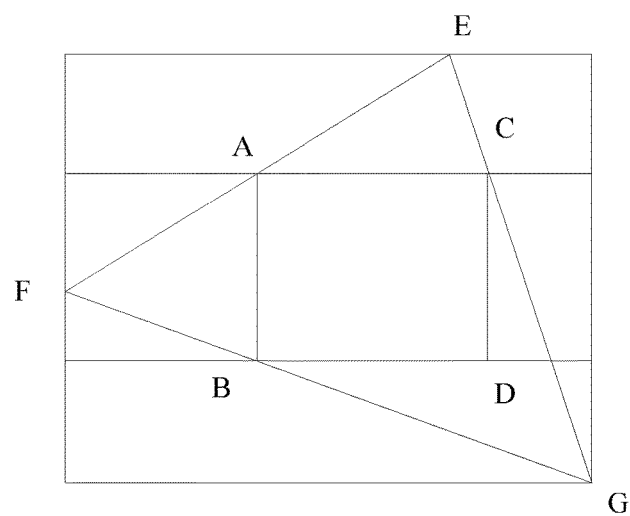
FIG. 8 is a schematic diagram of figuring out a maximum inscribed rectangle in a triangle.

FIG. 8 is a schematic diagram of figuring out a maximum inscribed rectangle in a triangle. As shown in FIG. 8, a rectangle ABCD is an inscribed rectangle of a triangle EFG. An optimal division point on each edge of the triangle is separately figured out, so as to obtain an inscribed rectangle corresponding to each edge. For example, a point A on an edge EF is selected, and two lines drawn from the point A are separately in parallel with edges of a display desktop. The two drawn lines separately intersect with an edge FG and an edge EG of the triangle EFG at a point B and a point C, and then the rectangle ABCD is determined. A value of EA/EF is denoted as p, and an area S of the rectangle ABCD may be represented as a parameter expression that includes p. When the area S is the largest, the point A is an optimal division point of the edge EF. Similarly, optimal division points on the edge FG and the edge EG may be separately figured out. A rectangle whose area is the largest in rectangles corresponding to optimal division points on three edges is the maximum inscribed rectangle that is solved for in the triangle EFG. A specific calculation method belongs to the field of geometry mathematics, and details are not described in this embodiment of the present disclosure.

Certainly, an irregular graph of another type may also exist, an algorithm for figuring out a maximum inscribed rectangle of the irregular graph belongs to the field of geometry mathematics, and details are not described in this embodiment of the present disclosure.

S422. Split the irregular drawing command into the one first-class drawing command and the at least one second-class drawing command using the bounding rectangle information and the maximum inscribed rectangle information of the irregular drawing command.

A drawing area of the at least one first-class drawing command is a maximum inscribed rectangle of the irregular drawing command, and a drawing area of the at least one second-class drawing command is a corner drawing area obtained after the maximum inscribed rectangle is subtracted from the drawing area of the irregular drawing command.

For example, in the graph shown in FIG. 6, FIG. 7, or FIG. 8, a bounding rectangle of the graph is divided into a maximum inscribed rectangle and several irregular corner areas. In addition, for an area of the maximum inscribed rectangle, a drawing mode of the maximum inscribed rectangle keeps unchanged, and drawing modes of other corner areas are changed to a wait mode.

In this embodiment of the present disclosure, an original irregular drawing command of which a shape of a drawing area is a triangle, a rotated rectangle, or an ellipse is split, according to a maximum inscribed rectangle, into one regular drawing command and several new irregular drawing commands; several new regular drawing commands are obtained after intersection detection is performed on the regular drawing command that is obtained after the splitting; one or more of the several new regular drawing commands may be combined in a command combining operation, which can improve an effect of overdraw elimination to some extent.

Optionally, in another embodiment, an irregular drawing command may be split into multiple first-class drawing commands and multiple second-class drawing commands. When a drawing area corresponding to the irregular drawing command is an irregular polygon, step S420 may be implemented as follows: segmenting the drawing area of the irregular polygon into multiple triangular drawing areas, and splitting the irregular drawing command into multiple third-class drawing commands according to a segmentation method of the irregular polygon, where the multiple third-class drawing commands are in one-to-one correspondence with the multiple triangular drawing areas; for each third-class drawing command, acquiring maximum inscribed rectangle information of the third-class drawing command according to bounding rectangle information and drawing area information of the third-class drawing command; and splitting the third-class drawing command into the one first-class drawing command and the at least one second-class drawing command using the bounding rectangle information and the maximum inscribed rectangle information of the third-class drawing command, where the drawing area corresponding to the first-class drawing command is a maximum inscribed rectangle corresponding to the third-class drawing command, and the drawing area corresponding to the at least one second-class drawing command is a corner area obtained after the maximum inscribed rectangle is subtracted from a drawing area corresponding to the third-class drawing command.

In this embodiment of the present disclosure, an irregular polygon is split into multiple triangles, and then each triangle is split into one maximum inscribed rectangle and three corner areas; an original drawing command is split into multiple regular drawing commands and multiple new irregular drawing commands according to areas obtained after the splitting; several new regular drawing commands are obtained after intersection detection is performed on the regular drawing commands that are obtained after the splitting; one or more of the several new regular drawing commands may be combined in a command combining operation, which can improve an effect of overdraw elimination to some extent.

S430. Group, into multiple drawing command sets according to the bounding rectangle information and the drawing area information, a regular drawing command in the multiple drawing commands, and the at least one first-class drawing command and the at least one second-class drawing command that are obtained after the irregular drawing command in the multiple drawing commands is split, so that drawing commands that belong to different drawing command sets do not intersect with each other.

After the command splitting in step S420, a current command queue includes a regular drawing command that exists when the command queue is received, and the at least one first-class drawing command and the at least one second-class drawing command that are obtained after the irregular drawing command is split.

A drawing area in the current command queue may be divided into multiple drawing partitions according to bounding rectangle information and drawing area information of each drawing command, so that drawing areas that are located in different drawing partitions do not intersect with each other, that is, there is no overlapped area between drawing areas of different drawing partitions. Then, drawing commands in each drawing partition form a drawing command set, and a drawing partition corresponds to a drawing command set.

After drawing commands are partitioned, the entire desktop is divided into multiple different drawing command sets.

The drawing commands are partitioned according to drawing areas, so that there are a limited quantity of drawing commands in each drawing command set, and a time for performing intersection detection on drawing commands in a drawing command set is greatly reduced.

According to a method in this embodiment of the present disclosure, an R+ tree algorithm is used, a fill factor is selected, and a limited quantity of drawing commands are loaded each time, so as to divide drawing commands into several drawing command sets.

A Sweep algorithm in which a split line is selected and a global algorithm Pack are included:
Sweep (axis, fill factor ff)
Input: a coordinate axis, a fill factor ff
Output: a split scheme
Manner: "sweep" in a direction of an x-axis and a direction of a y-axis, until encountering ff elements.
Pack
Input: a set S of multiple rectangles, and a fill factor ff
Output: an R+ tree that is good enough
[Method: packing layers from bottom to top]
If a quantity of elements in the S is less than ff:
establish a node R, and add all elements to R
Return R
set AN=∎
(R, S')=Sweep(S, ff), and adjusting bounding rectangles of R and S'
adjust the node R and a parent node of an existing R+ tree in an upstreaming manner
perform repeatedly until S' is empty When commands are divided, the commands may be disarranged. Therefore, a depth value may be added to each command according to an execution order, so as to learn the execution order subsequently.

Figure 9:
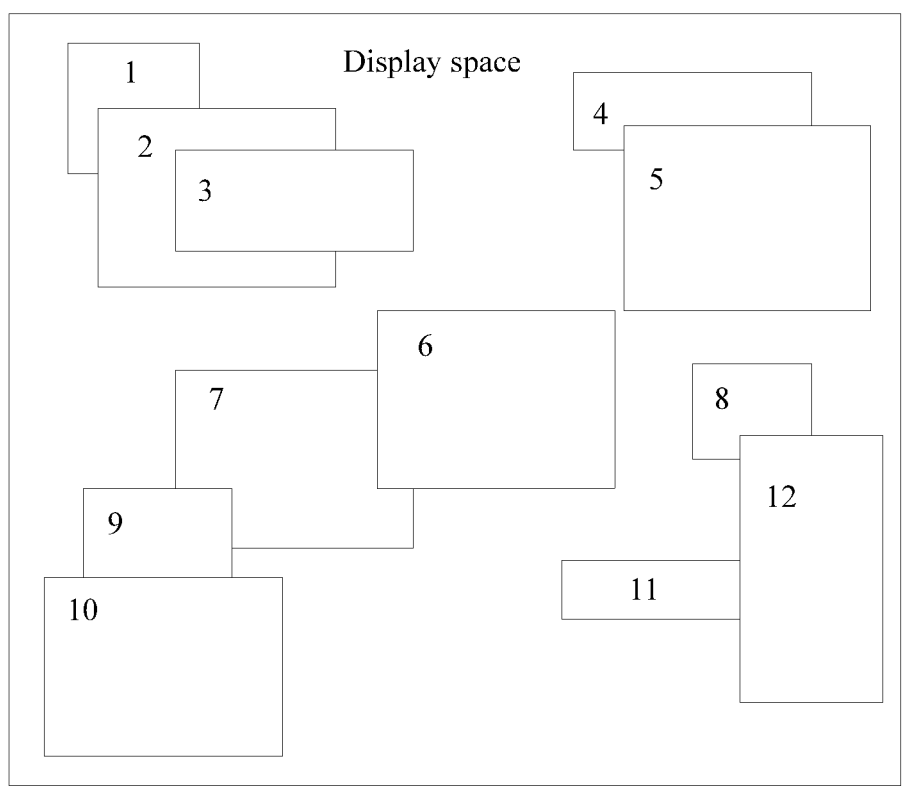
FIG. 9 is a schematic diagram of drawing areas corresponding to drawing commands in display space according to an embodiment of the present disclosure.

FIG. 9 is a schematic diagram of drawing areas corresponding to drawing commands in display space according to an embodiment of the present disclosure, where 12 drawing commands are included, and respectively correspond to 12 drawing areas in the display space.

An example in which a fill factor ff is equal to 5 is used, and command grouping of an R+ tree algorithm is performed.

Figure 10:
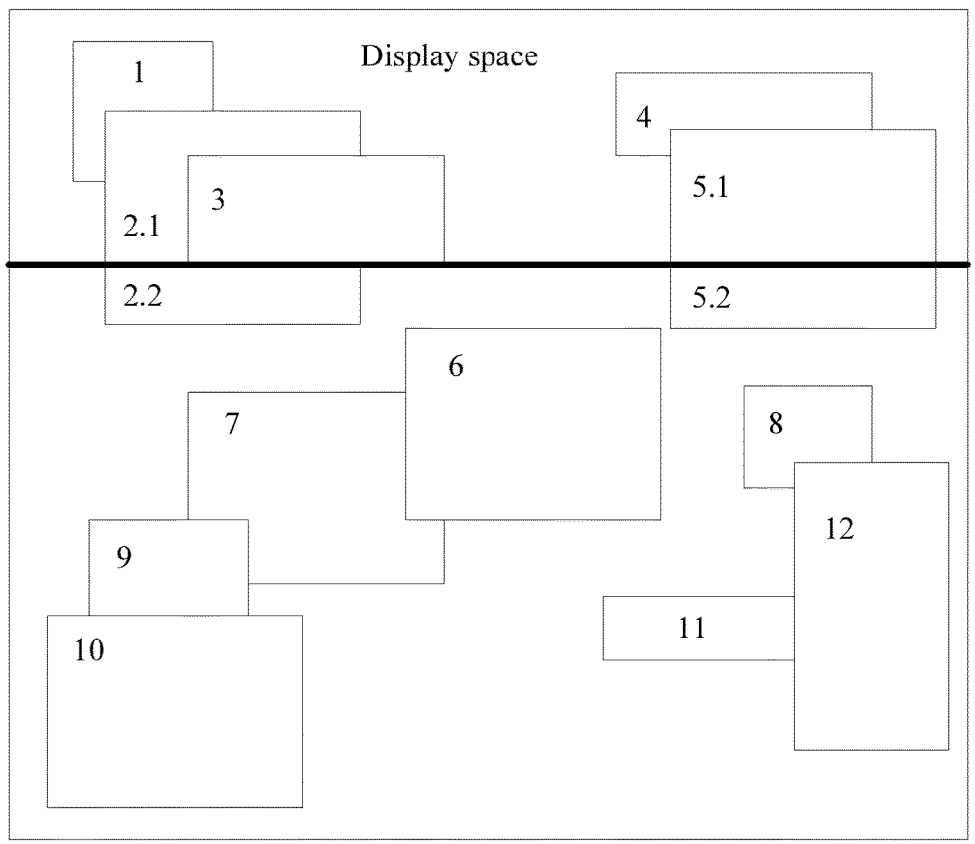
FIG. 10 is a schematic diagram of drawing areas after division is performed once in display space using an R+ tree algorithm according to an embodiment of the present disclosure.

FIG. 10 is a schematic diagram of drawing areas after division is performed once in display space using an R+ tree algorithm according to an embodiment of the present disclosure. Boundary lines of all rectangles are exhaustively enumerated according to an R+ tree algorithm, and a first division is shown in FIG. 10, where five rectangles (1, 2.1, 3, 4, 5.1) are divided, and an area of the divided rectangles is the smallest. The rectangles (1, 2.1, 3, 4, 5.1) are incorporated into a first leaf node.

Figure 11:
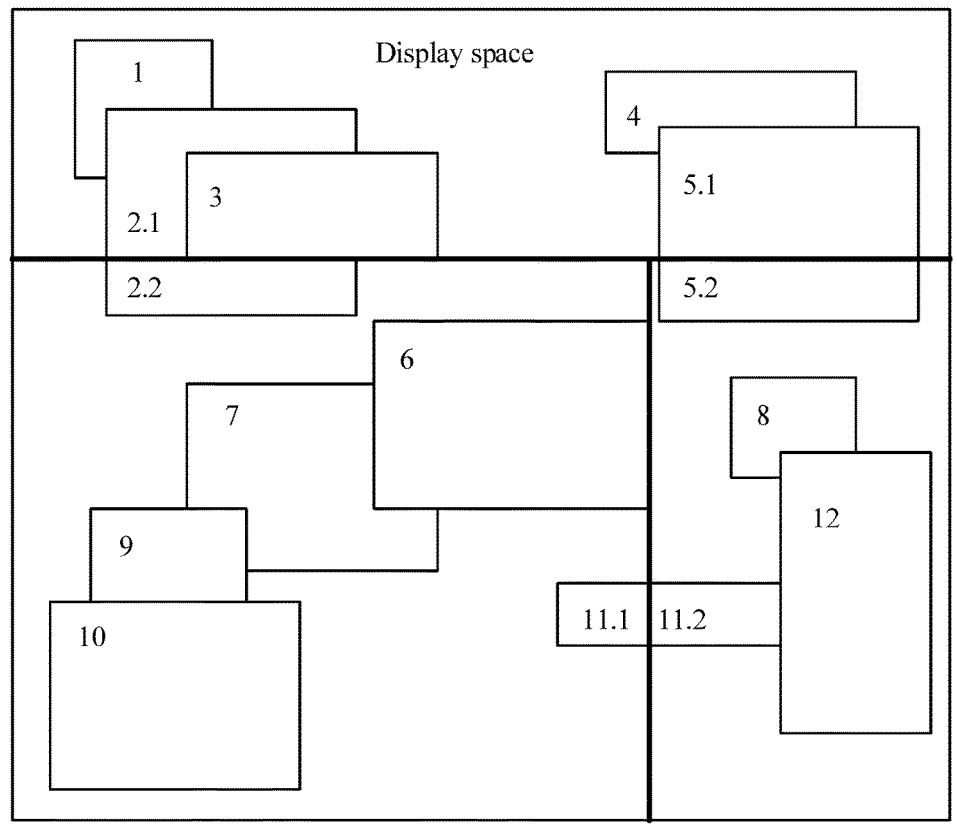
FIG. 11 is a schematic diagram of drawing areas after division is performed twice in display space using an R+ tree algorithm according to an embodiment of the present disclosure.

FIG. 11 is a schematic diagram of drawing areas after division is performed twice in display space using an R+ algorithm according to an embodiment of the present disclosure. Boundary lines of all rectangles in remaining areas are exhaustively enumerated according to an R+ tree algorithm, and a second division is shown in FIG. 11, where six rectangles (2.2, 6, 7, 9, 10, 11.1) are divided, and an area of the divided rectangles is the smallest. The rectangles six rectangles (2.2, 6, 7, 9, 10, 11.1) are incorporated into a second leaf node.

A quantity of remaining rectangles obtained after division is performed twice does not exceed a fill factor; therefore, rectangles (5.2, 8, 11.2, 12) in remaining areas are used to directly establish a leaf node.

Figure 12:
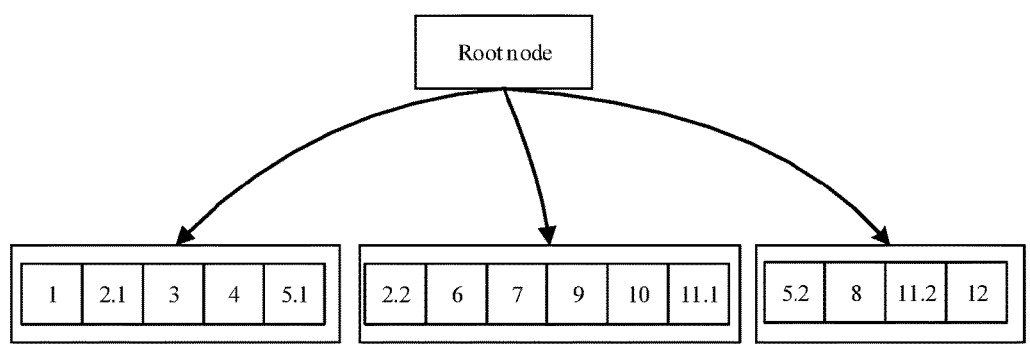
FIG. 12 is a schematic diagram of nodes of an R+ tree according to an embodiment of the present disclosure.

FIG. 12 is a schematic diagram of nodes of an R+ tree according to an embodiment of the present disclosure. After division is performed twice using an R+ tree algorithm, a diagram of an R+ tree shown in FIG. 12 is finally formed. In FIG. 12, the R+ tree includes leaf nodes (1, 2.1, 3, 4, 5.1), (2.2, 6, 7, 9, 10, 11.1), and (5.2, 8, 11.2, 12), where each leaf node represents a drawing command set.

In this embodiment of the present disclosure, an R+ tree algorithm is used, so that drawing command grouping can be performed rapidly, and each drawing command set obtained after the grouping is controlled in a specific scale, thereby reducing time complexity of intersection detection, and improving graphics processing efficiency of a graphics processing apparatus to a great extent.

S440. Separately perform intersection detection on the multiple drawing command sets according to the bounding rectangle information and the drawing area information, so that drawing commands in each drawing command set in the multiple drawing command sets do not intersect with each other.

After the drawing command sets are divided, intersection detection may be separately performed on drawing commands in each drawing command set. For specific implementation, reference may be made to the prior art, and details are not described in this embodiment of the present disclosure.

S450. Separately perform, according to execution content, a drawing mode, and the drawing area information, drawing command combining on the multiple drawing command sets on which the intersection detection is performed.

Drawing command combining may be performed, according to execution content, a drawing mode, and drawing area information of each drawing command, on the drawing command sets on which the intersection detection is performed, so as to remove an overdraw part. For specific implementation, reference may be made to the prior art, and details are not described in this embodiment of the present disclosure.

S460. Execute a drawing command obtained after combining is performed on each drawing partition.

When a drawing command of each drawing partition is executed, an execution order may be determined according to a depth of each drawing command.

It should be understood that a final drawing command of each drawing partition refers to a drawing command obtained after intersection detection and drawing command combining are performed on each drawing partition.

In this embodiment of the present disclosure, an irregular drawing command in a command queue of a current frame is split into a regular drawing command and an irregular drawing command according to a drawing area; a regular drawing command that exists before the splitting and the regular drawing command and irregular drawing command that are obtained after the splitting are grouped into multiple drawing command sets that do not intersect with each other; and then intersection detection and command combining are separately performed on each drawing command set. Drawing commands are grouped into multiple drawing command sets, and then intersection detection is performed, which can greatly reduce a time for intersection detection. In addition, original irregular drawing commands are split into regular drawing commands and irregular drawing commands, several new regular drawing commands are obtained after intersection detection is performed on the regular drawing commands that are obtained after the splitting, and one or more of the several new regular drawing commands may be combined in a command combining operation, which can improve an effect of overdraw elimination to some extent. Therefore, graphics processing performance can be improved.

Figure 13:
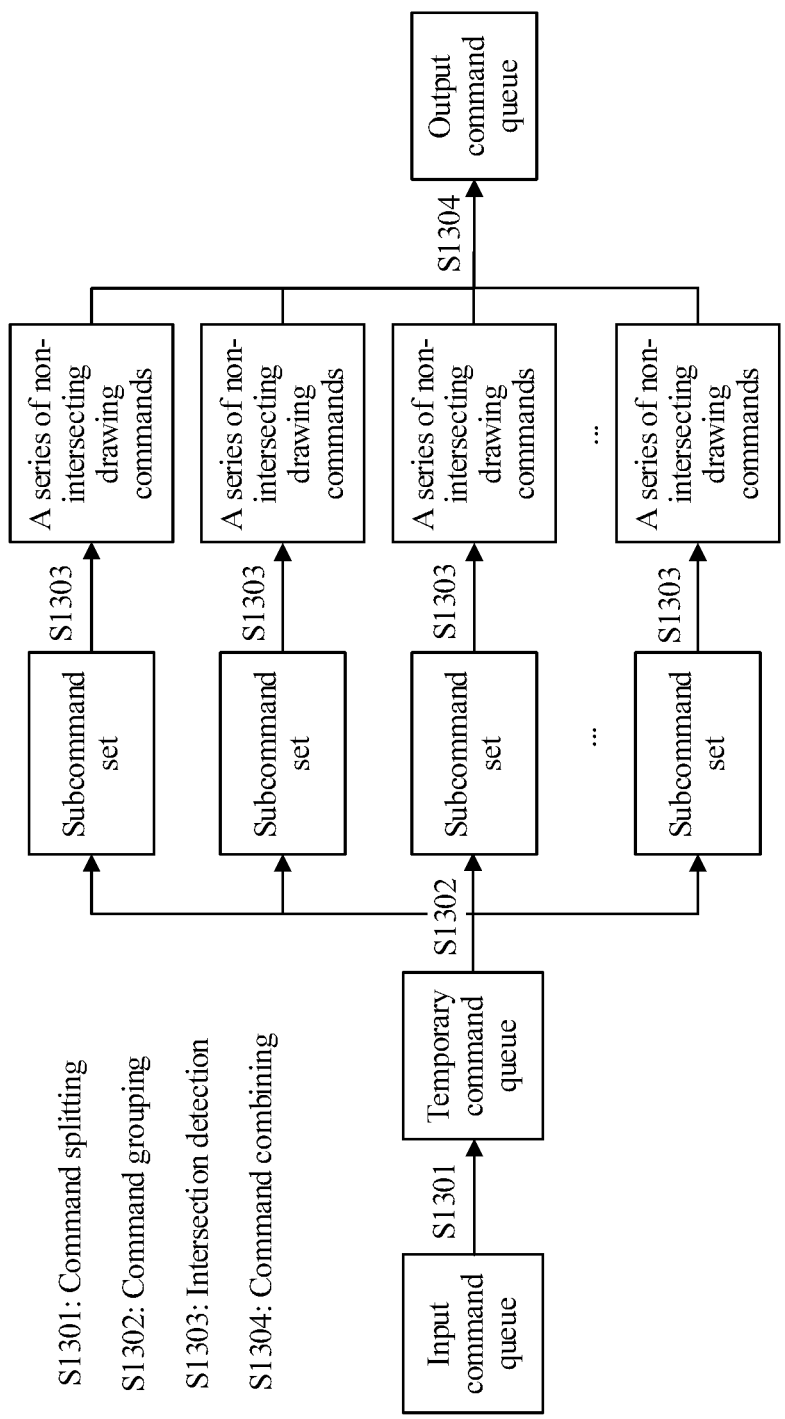
FIG. 13 is a schematic diagram of evolution of a command queue in a graphics processing method according to an embodiment of the present disclosure.

FIG. 13 is a schematic diagram of evolution of a command queue in a graphics processing method according to an embodiment of the present disclosure. A specific evolution procedure is as follows.

Step 1: Input a command queue.

Step 1 in FIG. 4 is step S410: receive a command queue input by a current frame.

Step 2: Split a command.

Command splitting is performed on the input command queue according to step S420 in FIG. 4, to form a temporary command queue.

Step 3: Partition commands.

Command partitioning is performed on the temporary command queue according to step S430 in FIG. 4, to obtain a series of drawing partitions, where each drawing partition corresponds to a subcommand set of a drawing command, and drawing commands in different subcommand sets do not intersect with each other. That two drawing commands do not intersect with each other indicates that there is no overlapped area between drawing areas corresponding to the two drawing commands.

Step 4: Perform intersection detection.

Intersection detection is performed on each subcommand set according to step S440 in FIG. 4. After intersection detection is performed on each subcommand set, a series of non-intersecting drawing commands can be obtained. It should be understood that, after intersection detection, drawing areas corresponding to any two drawing commands in a same subcommand set are not overlapped.

Step 5: Perform command combining.

Command combining is performed, according to step S450 in FIG. 4, on a drawing command obtained after intersection detection is performed on each subcommand set, to form a new command queue in an aggregation manner. The command queue is an input command queue.

In this embodiment of the present disclosure, an irregular drawing command in a command queue of a current frame is split into a regular drawing command and an irregular drawing command according to a drawing area; a regular drawing command that exists before the splitting and the regular drawing command and irregular drawing command that are obtained after the splitting are grouped into multiple drawing command sets that do not intersect with each other; and then intersection detection and command combining are separately performed on each drawing command set. Drawing commands are grouped into multiple drawing command sets, and then intersection detection is performed, which can greatly reduce a time for intersection detection. In addition, original irregular drawing commands are split into regular drawing commands and irregular drawing commands, several new regular drawing commands are obtained after intersection detection is performed on the regular drawing commands that are obtained after the splitting, and one or more of the several new regular drawing commands may be combined in a command combining operation, which can improve an effect of overdraw elimination to some extent. Therefore, graphics processing performance can be improved.

Figure 14:
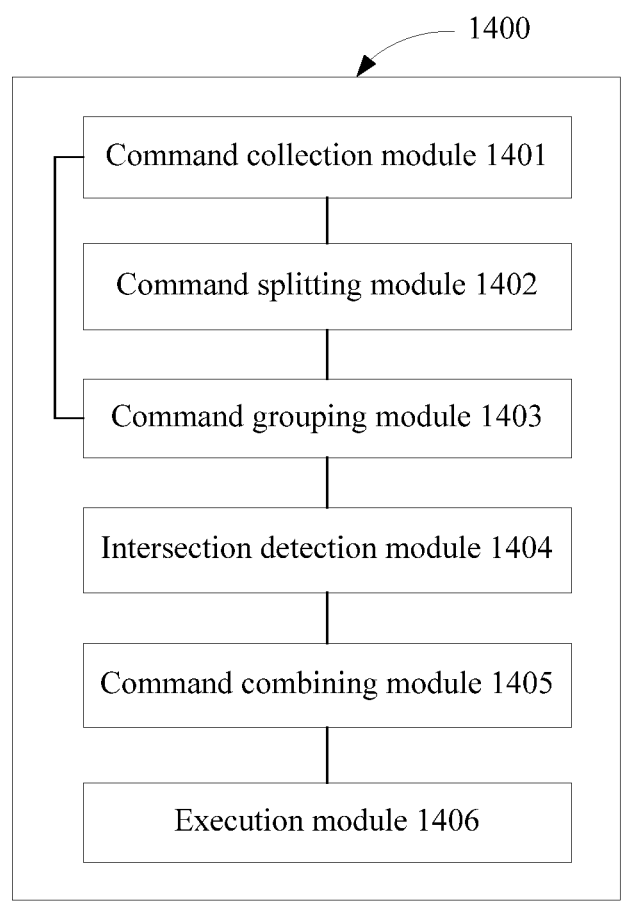
FIG. 14 is a schematic structural diagram of a graphics processing apparatus according to an embodiment of the present disclosure.

FIG. 14 is a schematic structural diagram of a graphics processing apparatus 1400 according to an embodiment of the present disclosure. As shown in FIG. 14, the graphics processing apparatus 1400 may include a command collection module 1401, a command splitting module 1402, a command grouping module 1403, an intersection detection module 1404, a command combining module 1405, and an execution module 1406.

The command collection module 1401 is configured to receive a command queue input by a current frame, where the command queue includes multiple drawing commands, each drawing command carries bounding rectangle information, execution content, a drawing mode, and drawing area information, and the drawing mode includes an opaque mode, a blend mode, or a wait mode.

The command splitting module 1402 is configured to split, according to the bounding rectangle information and the drawing area information, each irregular drawing command in the multiple drawing commands into at least one first-class drawing command and at least one second-class drawing command, where a drawing area of the at least one first-class drawing command is a rectangle in a drawing area corresponding to the irregular drawing command, a drawing area of the at least one second-class drawing command is a remaining corner area obtained after the drawing area of the at least one first-class drawing command is subtracted from the drawing area corresponding to the irregular drawing command, a drawing mode of the at least one first-class drawing command is the same as a drawing mode of the irregular drawing command, and a drawing mode of the at least one second-class drawing command is the wait mode.

The command grouping module 1403 is configured to group, into multiple drawing command sets according to the bounding rectangle information and the drawing area information, a regular drawing command in the multiple drawing commands, and the at least one first-class drawing command and the at least one second-class drawing command that are obtained after the irregular drawing command in the multiple drawing commands is split, so that drawing commands that belong to different drawing command sets do not intersect with each other.

The intersection detection module 1404 is configured to separately perform intersection detection on the multiple drawing command sets according to the bounding rectangle information and the drawing area information, so that drawing commands in each drawing command set in the multiple drawing command sets do not intersect with each other.

The command combining module 1405 is configured to separately perform, according to the execution content, the drawing mode, and the drawing area information, drawing command combining on the multiple drawing command sets on which the intersection detection is performed.

The execution module 1406 is configured to execute a drawing command obtained after combining is performed on each drawing command set.

In this embodiment of the present disclosure, the graphics processing apparatus 1400 splits an irregular drawing command in a command queue of a current frame into a regular drawing command and an irregular drawing command according to a drawing area; groups, into multiple drawing command sets that do not intersect with each other, a regular drawing command that exists before the splitting and the regular drawing command and irregular drawing command that are obtained after the splitting; and then separately performs intersection detection and command combining on each drawing command set. Drawing commands are grouped into multiple drawing command sets, and then intersection detection is performed, which can greatly reduce a time for intersection detection. In addition, original irregular drawing commands are split into regular drawing commands and irregular drawing commands, several new regular drawing commands are obtained after intersection detection is performed on the regular drawing commands that are obtained after the splitting, and one or more of the several new regular drawing commands may be combined in a command combining operation, which can improve an effect of overdraw elimination to some extent. Therefore, graphics processing performance can be improved.

Optionally, in an embodiment, the command splitting module 1402 is configured to acquire maximum inscribed rectangle information of the irregular drawing command according to bounding rectangle information and drawing area information of the irregular drawing command; and split the irregular drawing command into the one first-class drawing command and the at least one second-class drawing command using the bounding rectangle information and the maximum inscribed rectangle information of the irregular drawing command, where the drawing area corresponding to the first-class drawing command is a maximum inscribed rectangle corresponding to the irregular drawing command, and the drawing area corresponding to the at least one second-class drawing command is a corner area obtained after the maximum inscribed rectangle is subtracted from the drawing area corresponding to the irregular drawing command.

In this embodiment of the present disclosure, the graphics processing apparatus 1400 splits, according to a maximum inscribed rectangle, an original irregular command of which a shape of a drawing area is a triangle, a rotated rectangle, or an ellipse into one regular drawing command and several new irregular drawing commands; several new regular drawing commands are obtained after intersection detection is performed on the regular drawing command that is obtained after the splitting; one or more of the several new regular drawing commands may be combined in a command combining operation, which can improve an effect of overdraw elimination to some extent.

Optionally, in another embodiment, the command splitting module 1402 is configured to, when the drawing area corresponding to the irregular drawing command is an irregular polygon, segment a drawing area of the irregular polygon into multiple triangular drawing areas, and split the irregular drawing command into multiple third-class drawing commands according to a segmentation method of the irregular polygon, where the multiple third-class drawing commands are in one-to-one correspondence with the multiple triangular drawing areas; for each third-class drawing command, acquire maximum inscribed rectangle information of the third-class drawing command according to bounding rectangle information and drawing area information of the third-class drawing command; and split the third-class drawing command into the one first-class drawing command and the at least one second-class drawing command using the bounding rectangle information and the maximum inscribed rectangle information of the third-class drawing command, where the drawing area corresponding to the first-class drawing command is a maximum inscribed rectangle corresponding to the third-class drawing command, and the drawing area corresponding to the at least one second-class drawing command is a corner area obtained after the maximum inscribed rectangle is subtracted from a drawing area corresponding to the third-class drawing command.

In this embodiment of the present disclosure, the graphics processing apparatus 1400 splits an irregular polygon into multiple triangles, and then splits each triangle into one maximum inscribed rectangle and three corner areas; and splits an original drawing command into multiple regular drawing commands and multiple new irregular drawing commands according to areas obtained after the splitting; several new regular drawing commands are obtained after intersection detection is performed on the regular drawing commands that are obtained after the splitting; one or more of the several new regular drawing commands may be combined in a command combining operation, which can improve an effect of overdraw elimination to some extent.

Optionally, the command grouping module 1403 is configured to group, into multiple drawing command sets according to the bounding rectangle information and the drawing area information using an R+ tree algorithm, a regular drawing command in the multiple drawing commands, and the at least one first-class drawing command and the at least one second-class drawing command that are obtained after the irregular drawing command in the multiple drawing commands is split, so that drawing commands that belong to different drawing command sets do not intersect with each other.

In this embodiment of the present disclosure, the graphics processing apparatus 1400 can rapidly perform drawing command grouping using an R+ tree algorithm, and each drawing command set obtained after the grouping is controlled in a specific scale, thereby reducing time complexity of intersection detection, and improving graphics processing efficiency of the graphics processing apparatus to a great extent.

In addition, the graphics processing apparatus 1400 may further execute methods of FIG. 4 and FIG. 13, and implement functions of the graphics processing apparatus in the embodiments shown in FIG. 4 and FIG. 13. Details are not described in this embodiment of the present disclosure.

In the foregoing multiple embodiments of the graphics processing apparatus, it should be understood that, in an implementation manner, a command collection module may be implemented using a communications interface, and a command splitting module, a command grouping module, an intersection detection module, a command combining module, and an execution module may be implemented by executing, by a processor, a program or an instruction in a storage (in other words, the processor cooperates with a special instruction in the storage to which the processor is coupled, to implement the command splitting module, the command grouping module, the intersection detection module, the command combining module, and the execution module). In another implementation manner, the command collection module, the command splitting module, the command grouping module, the intersection detection module, the command combining module, and the execution module may be separately implemented using an application-specific integrated circuit (ASIC). For a specific implementation manner, reference may be made to the prior art, and details are not described herein. The present disclosure includes but is not limited to the foregoing implementation manners, and it should be understood that, solutions implemented according to the ideas of the present disclosure shall fall within the protection scope of the embodiments of the present disclosure.

Figure 15:
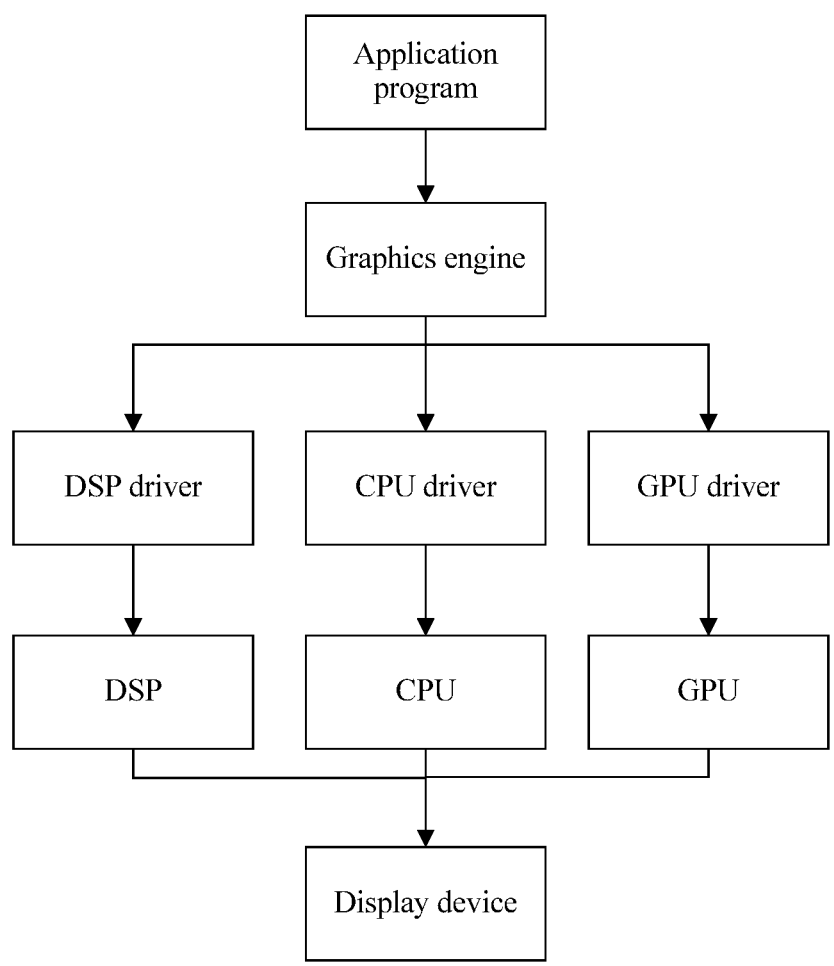
FIG. 15 is a specific schematic flowchart of graphics processing according to an embodiment of the present disclosure.

A specific application method of the graphics processing apparatus in this embodiment of the present disclosure is shown in FIG. 15. FIG. 15 is a specific schematic flowchart of graphics processing according to an embodiment of the present disclosure. In FIG. 15, an application program is a user-oriented product, and requires, for running, support of an entity having a capability of graphics processing. The application program may be an online game, a CAD cartography tool, or the like. The graphics processing apparatus 1400 may correspond to an implementation manner of a combination of software and hardware: a graphics engine, a processor driver, and a processor shown in FIG. 15 (it should be understood that, the graphics engine and the processor driver herein may be understood as a program or an instruction stored in a memory). After a drawing command output by the application program is processed by the graphics engine, a series of new drawing commands are obtained; the graphics engine sends, using the processor driver, the series of new drawing commands that are obtained after the processing to a corresponding processor (for example, the graphics engine sends, using a digital signal processing (DSP) driver, the series of new drawing commands that are obtained after the processing to a DSP, or to a CPU using a CPU driver, or to a GPU using a GPU driver), and then the processor (such as the DSP, the CPU, or the GPU) executes the series of new drawing commands that are obtained after the processing, and outputs a final rendering result to a display device (such as a display unit shown in FIG. 16).

The graphics processing apparatus 1400 in the foregoing embodiments of the present disclosure may be implemented in a form of hardware, software, or a combination of hardware and software, and may be implemented as one or more computer systems or another processing system.

Figure 16:
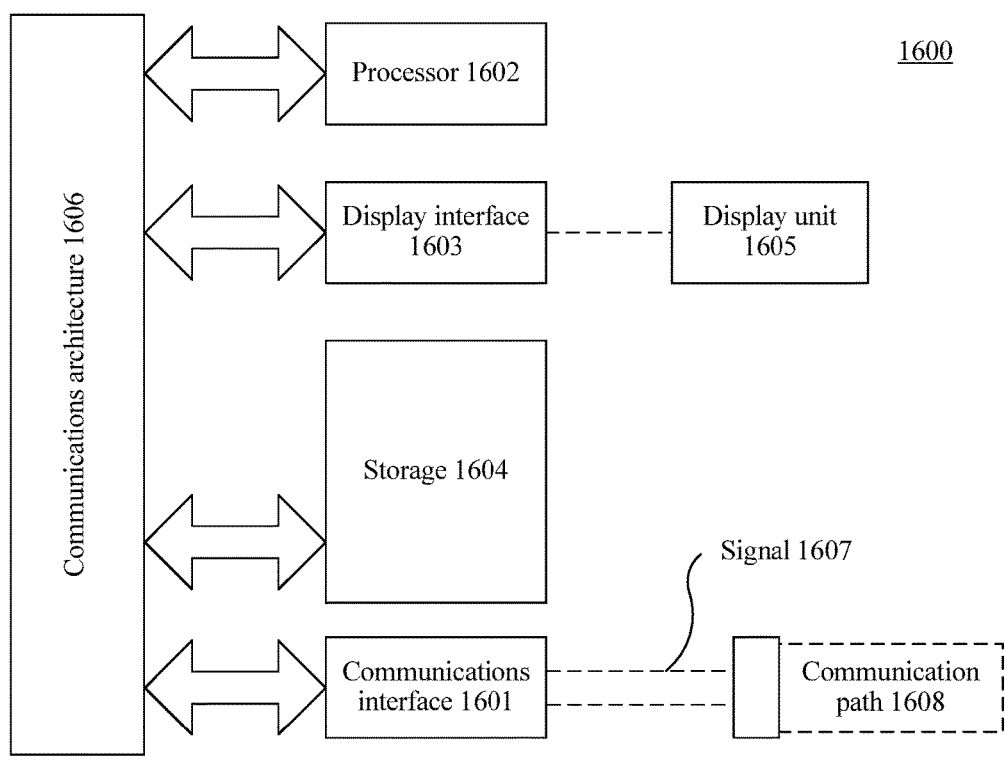
FIG. 16 is a schematic structural diagram of a computer system according to an embodiment of the present disclosure.

The following describes an exemplary implementation manner of a graphics processing apparatus with reference to FIG. 16. For ease of description, the graphics processing apparatus in the following embodiment is collectively referred to as a computer system.

FIG. 16 is a schematic structural diagram of a computer system 1600 according to an embodiment of the present disclosure. An embodiment of the present disclosure is shown in FIG. 16, and the computer system 1600 may include a processor 1602, a storage 1604, a communications interface 1601, and a display interface 1603.

The processor 1602, the storage 1604, the communications interface 1601, and the display interface 1603 are connected to each other using a communications architecture 1606, where the communications architecture 1606 may be a bus, a network, or the like. When the communications architecture 1606 is a bus, the bus may be an industry standard architecture (ISA) bus, a peripheral component interconnect (PCI) bus, an extended industry standard architecture (EISA) bus, or the like. The bus may be classified into an address bus, a data bus, a control bus, and the like. When the communications architecture 1606 is a network, the network may be a wired network such as a fiber network or a telephone line, or a wireless network such as a cell connection, a radio frequency connection, or another communications channel.

The display interface 1603 may be connected to a display unit 1605. The display unit 1605 includes a display (such as a touchscreen, an LCD, a CRT, a holographic imaging device (Holographic), or a projector). The display interface 1603 is configured to output display data of the computer system 1600 to the display unit 1605 connected to the computer system 1600, and the display unit 1605 displays the display data of the computer system 1600. The storage 1603 may further include a frame buffer, and the computer system 1600 processes the display data in the frame buffer; after the display data is processed, the computer system 1600 outputs data of the frame buffer to the display unit 1605 using the display interface 1603. The display unit 1605 may be configured to display information input by a user or information provided for a user, and various menu interfaces of a device (such as a mobile terminal, a computer, an intelligent set-top box, or an intelligent all-in-one machine) in which the graphics processing apparatus is located. The display unit 1605 may include a display panel, and optionally, the display panel may be configured in a form of an LCD, an organic light-emitting diode (OLED), or the like. Optionally, the display unit 1605 may further include a touch panel, and the touch panel covers the display panel, to form a touch display screen.

The communications interface 1601 is configured to implement communication between the computer system 1600 and an external device of the computer system 1600. The communications interface 1601 may convert data of the computer system 1600 into a signal 1607, and send the signal 1607 through a communication path 1608; or receive a signal 1607 from a communication path 1608, and convert the signal 1607 into data. The communications interface 1601 may be a modem, a network interface (such as an Ethernet interface), a communication port, a personal computer memory card international association (PCMCIA) expansion slot, a PCMCIA expansion card, or the like. The signal 1607 may be an optical signal, an electrical signal, or a signal in another form. The communication path 1608 may be a fiber network, a telephone line, a cell connection, a radio frequency connection, or another communications channel.

The storage 1604 is configured to store a program. The program may include program code, and the program code includes a computer operation instruction. The storage 1604 may include a read-only memory and a random access memory, and provides an instruction and data for the processor 1602. The storage 1604 may include a high-speed random access memory (RAM), and may further include a non-volatile memory, such as at least one magnetic disk memory.

The processor 1602 executes the program stored in the storage 1604 and is configured to perform the following operations: receiving a command queue input by a current frame, where the command queue includes multiple drawing commands, each drawing command carries bounding rectangle information, execution content, a drawing mode, and drawing area information, and the drawing mode includes an opaque mode, a blend mode, or a wait mode; splitting, according to the bounding rectangle information and the drawing area information, each irregular drawing command in the multiple drawing commands into at least one first-class drawing command and at least one second-class drawing command, where a drawing area of the at least one first-class drawing command is a rectangle in a drawing area corresponding to the irregular drawing command, a drawing area of the at least one second-class drawing command is a remaining corner area obtained after the drawing area of the at least one first-class drawing command is subtracted from the drawing area corresponding to the irregular drawing command, a drawing mode of the at least one first-class drawing command is the same as a drawing mode of the irregular drawing command, and a drawing mode of the at least one second-class drawing command is the wait mode; grouping, into multiple drawing command sets according to the bounding rectangle information and the drawing area information, a regular drawing command in the multiple drawing commands, and the at least one first-class drawing command and the at least one second-class drawing command that are obtained after the irregular drawing command in the multiple drawing commands is split, so that drawing commands that belong to different drawing command sets do not intersect with each other; separately performing intersection detection on the multiple drawing command sets according to the bounding rectangle information and the drawing area information, so that drawing commands in each drawing command set in the multiple drawing command sets do not intersect with each other; separately performing, according to the execution content, the drawing mode, and the drawing area information, drawing command combining on the multiple drawing command sets on which the intersection detection is performed; and executing a drawing command obtained after combining is performed on each drawing command set.

The foregoing method that is executed by a graphics processing apparatus and disclosed in either embodiment of FIG. 4 or FIG. 13 of the present disclosure may be applied to the processor 1602 or implemented by the processor 1602. In this embodiment of the present disclosure, the computer system 1600 may include one or more processors 1602. The processor 1602 may be an integrated circuit chip and has a signal processing capability. In an implementation process, steps in the foregoing method may be completed by means of an integrated logic circuit of hardware in the processor 1602 or an instruction in a form of software. The foregoing processor 1602 may be a general purpose processor, including a CPU, a network processor (NP), and the like, and may further be a DSP, an ASIC, a field programmable gate array (FPGA), or another programmable logic device, discrete gate or transistor logic device, or discrete hardware component, or a dedicated processor, such as a GPU. The processor 1602 may implement or execute methods, steps, and logical block diagrams disclosed in the embodiments of the present disclosure. The general purpose processor may be a microprocessor, or the processor may be any conventional processor or the like. Steps of the methods disclosed with reference to the embodiments of the present disclosure may be directly executed and completed by means of a hardware decoding processor, or may be executed and completed using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the storage 1603, and the processor 1602 reads information in the storage 1604 and completes the steps in the foregoing method in combination with hardware of the processor 1602.

In this embodiment of the present disclosure, the computer system 1600 splits an irregular drawing command in a command queue of a current frame into a regular drawing command and an irregular drawing command according to a drawing area; groups, into multiple drawing command sets that do not intersect with each other, a regular drawing command that exists before the splitting and the regular drawing command and irregular drawing command that are obtained after the splitting; and then separately performs intersection detection and command combining on each drawing command set. Drawing commands are grouped into multiple drawing command sets, and then intersection detection is performed, which can greatly reduce a time for intersection detection. In addition, original irregular drawing commands are split into regular drawing commands and irregular drawing commands, several new regular drawing commands are obtained after intersection detection is performed on the regular drawing commands that are obtained after the splitting, and one or more of the several new regular drawing commands may be combined in a command combining operation, which can improve an effect of overdraw elimination to some extent. Therefore, graphics processing performance can be improved.

Optionally, in an embodiment, in a process of splitting, according to the bounding rectangle information and the drawing area information, each irregular drawing command in the multiple drawing commands into at least one first-class drawing command and at least one second-class drawing command, the processor 1602 is configured to acquire maximum inscribed rectangle information of the irregular drawing command according to bounding rectangle information and drawing area information of the irregular drawing command; and split the irregular drawing command into the one first-class drawing command and the at least one second-class drawing command using the bounding rectangle information and the maximum inscribed rectangle information of the irregular drawing command, where the drawing area corresponding to the first-class drawing command is a maximum inscribed rectangle corresponding to the irregular drawing command, and the drawing area corresponding to the at least one second-class drawing command is a corner area obtained after the maximum inscribed rectangle is subtracted from the drawing area corresponding to the irregular drawing command.

In this embodiment of the present disclosure, the computer system 1600 splits, according to a maximum inscribed rectangle, an original irregular command of which a shape of a drawing area is a triangle, a rotated rectangle, or an ellipse into one regular drawing command and several new irregular drawing commands; several new regular drawing commands are obtained after intersection detection is performed on the regular drawing command that is obtained after the splitting; one or more of the several new regular drawing commands may be combined in a command combining operation, which can improve an effect of overdraw elimination to some extent.

Optionally, in another embodiment, in a process of splitting, according to the bounding rectangle information and the drawing area information, each irregular drawing command in the multiple drawing commands into at least one first-class drawing command and at least one second-class drawing command, the processor 1602 is configured to, when the drawing area corresponding to the irregular drawing command is an irregular polygon, segment a drawing area of the irregular polygon into multiple triangular drawing areas, and split the irregular drawing command into multiple third-class drawing commands according to a segmentation method of the irregular polygon, where the multiple third-class drawing commands are in one-to-one correspondence with the multiple triangular drawing areas; for each third-class drawing command, acquire maximum inscribed rectangle information of the third-class drawing command according to bounding rectangle information and drawing area information of the third-class drawing command; and split the third-class drawing command into the one first-class drawing command and the at least one second-class drawing command using the bounding rectangle information and the maximum inscribed rectangle information of the third-class drawing command, where the drawing area corresponding to the first-class drawing command is a maximum inscribed rectangle corresponding to the third-class drawing command, and the drawing area corresponding to the at least one second-class drawing command is a corner area obtained after the maximum inscribed rectangle is subtracted from a drawing area corresponding to the third-class drawing command.

In this embodiment of the present disclosure, the computer system 1600 splits an irregular polygon into multiple triangles, and then splits each triangle into one maximum inscribed rectangle and three corner areas; and splits an original drawing command into multiple regular drawing commands and multiple new irregular drawing commands according to areas obtained after the splitting; several new regular drawing commands are obtained after intersection detection is performed on the regular drawing commands that are obtained after the splitting; one or more of the several new regular drawing commands may be combined in a command combining operation, which can improve an effect of overdraw elimination to some extent.

Optionally, the processor 1602 is configured to group, into multiple drawing command sets according to the bounding rectangle information and the drawing area information using an R+ tree algorithm, a regular drawing command in the multiple drawing commands, and the at least one first-class drawing command and the at least one second-class drawing command that are obtained after the irregular drawing command in the multiple drawing commands is split, so that drawing commands that belong to different drawing command sets do not intersect with each other.

In this embodiment of the present disclosure, the computer system 1600 can rapidly perform drawing command grouping using an R+ tree algorithm, and each drawing command set obtained after the grouping is controlled in a specific scale, thereby reducing time complexity of intersection detection, and improving graphics processing efficiency of the graphics processing apparatus to a great extent.

In addition, the computer system 1600 may further execute methods of FIG. 4 and FIG. 13, and implement functions of the graphics processing apparatus in the embodiments shown in FIG. 4 and FIG. 13. Details are not described in this embodiment of the present disclosure.

Figure 17:
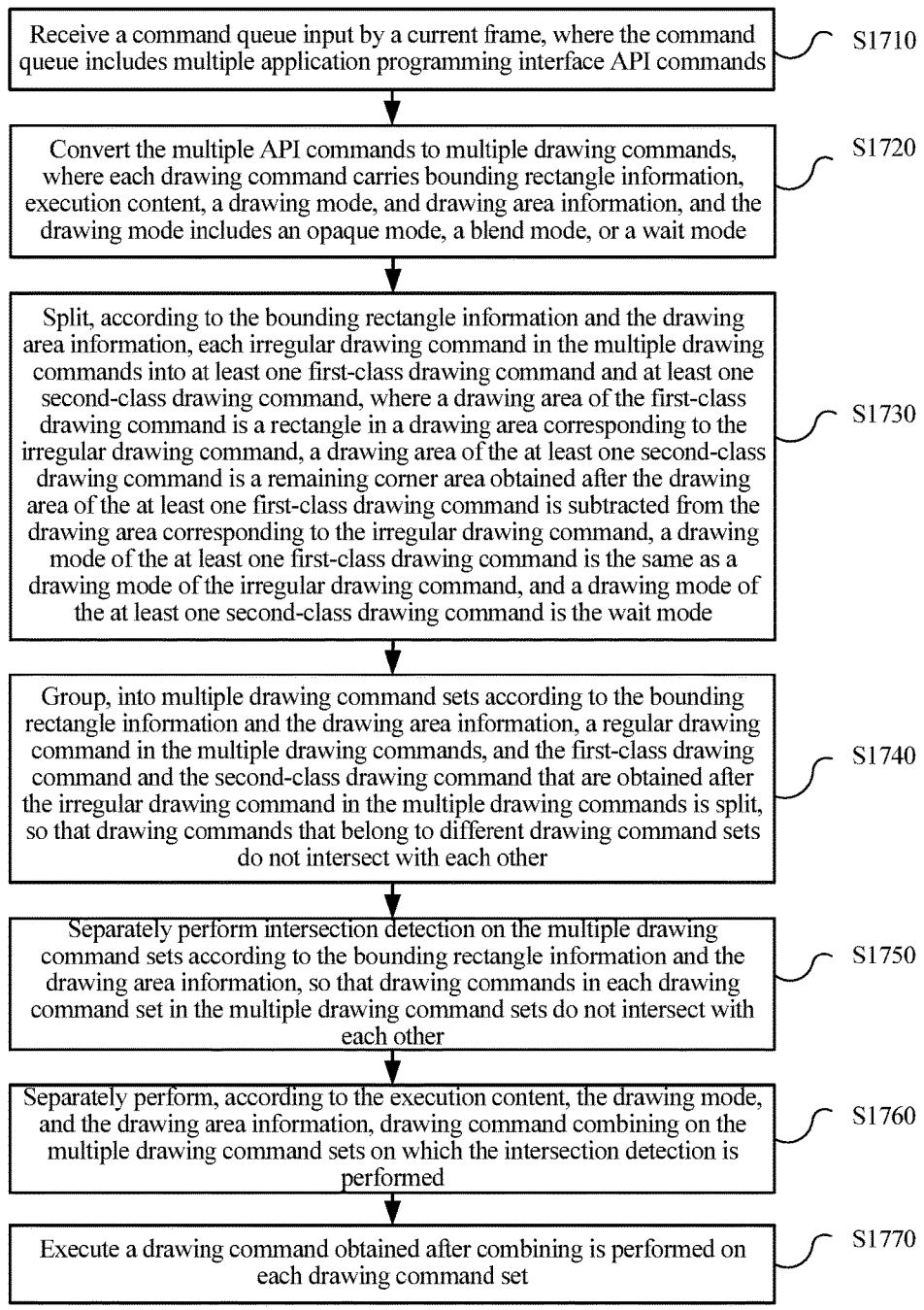
FIG. 17 is a schematic diagram of another graphics processing method according to an embodiment of the present disclosure.

FIG. 17 is a schematic diagram of another graphics processing method according to an embodiment of the present disclosure. The method of FIG. 17 is executed by a graphics processing apparatus. The graphics processing apparatus may be a computer system such as a graphics engine, or a graphics processing unit such as a GPU chip. As shown in FIG. 17, the method includes the following steps.

S1710. Receive a command queue input by a current frame.

The command queue includes multiple API commands.

S1720. Convert multiple API commands to multiple drawing commands.

Each drawing command carries bounding rectangle information, execution content, a drawing mode, and drawing area information, and the drawing mode includes an opaque mode, a blend mode, or a wait mode.

In specific application, a Skia module in an Android terminal may be reconstructed, that is, a class of a deferred rendering function (SkDeferredMultiCanvas class) is created, a command parsing module SkCommand is created, and a drawing API command of the Skia is converted into a command that can be identified by an overdraw removal engine.

S1730. Split, according to bounding rectangle information and drawing area information, each irregular drawing command in the multiple drawing commands into at least one first-class drawing command and at least one second-class drawing command.

A drawing area of the at least one first-class drawing command is a rectangle in a drawing area corresponding to the irregular drawing command, a drawing area of the at least one second-class drawing command is a remaining corner area obtained after the drawing area of the at least one first-class drawing command is subtracted from the drawing area corresponding to the irregular drawing command, a drawing mode of the at least one first-class drawing command is the same as a drawing mode of the irregular drawing command, and a drawing mode of the at least one second-class drawing command is the wait mode.

For specific implementation of step S1730, reference may be made to the embodiment in which step S420 is described and the embodiment shown in FIG. 5.

S1740. Group, into multiple drawing command sets according to the bounding rectangle information and the drawing area information, a regular drawing command in the multiple drawing commands, and the at least one first-class drawing command and the at least one second-class drawing command that are obtained after the irregular drawing command in the multiple drawing commands is split, so that drawing commands that belong to different drawing command sets do not intersect with each other.

For specific implementation of step S1740, reference may be made to the embodiment in which step S430 is described.

S1750. Separately perform intersection detection on the multiple drawing command sets according to the bounding rectangle information and the drawing area information, so that drawing commands in each drawing command set in the multiple drawing command sets do not intersect with each other.

S1760. Separately perform, according to execution content, a drawing mode, and the drawing area information, drawing command combining on the multiple drawing command sets on which the intersection detection is performed.

For specific implementation of step S1750 and step S1760, reference may be made to the prior art, and details are not described in this embodiment of the present disclosure.

S1770. Execute a drawing command obtained after combining is performed on each drawing command set.

When an API is invoked during rendering, a drawing command is first parsed by the command parsing module into a command, and then the command is put into a command queue; when the command needs to be displayed on a screen, an overdraw removal engine is invoked to process the command queue, a rendering task is tailored, and the command is executed to invoke an SkCanvas that actually performs drawing.

An Android Framework layer is modified, and a new SkDeferredMultiCanvas is invoked to replace an original SkCanvas to perform drawing.

In this embodiment of the present disclosure, multiple API commands in a command queue of a current frame are converted into multiple drawing commands, and an irregular drawing command in the multiple drawing commands is split into a regular drawing command and an irregular drawing command according to a drawing area; a regular drawing command that exists before the splitting and the regular drawing command and irregular drawing command that are obtained after the splitting are grouped into multiple drawing command sets that do not intersect with each other; and then intersection detection and command combining are separately performed on each drawing command set. Drawing commands are grouped into multiple drawing command sets, and then intersection detection is performed, which can greatly reduce a time for intersection detection. In addition, original irregular drawing commands are split into regular drawing commands and irregular drawing commands, several new regular drawing commands are obtained after intersection detection is performed on the regular drawing commands that are obtained after the splitting, and one or more of the several new regular drawing commands may be combined in a command combining operation, which can improve an effect of overdraw elimination to some extent. Therefore, graphics processing performance can be improved.

Optionally, in an embodiment, step S1730 is implemented as follows: acquiring maximum inscribed rectangle information of the irregular drawing command according to bounding rectangle information and drawing area information of the irregular drawing command; and splitting the irregular drawing command into the one first-class drawing command and the at least one second-class drawing command using the bounding rectangle information and the maximum inscribed rectangle information of the irregular drawing command, where the drawing area corresponding to the first-class drawing command is a maximum inscribed rectangle corresponding to the irregular drawing command, and the drawing area corresponding to the at least one second-class drawing command is a corner area obtained after the maximum inscribed rectangle is subtracted from the drawing area corresponding to the irregular drawing command.

In this embodiment of the present disclosure, an original irregular command of which a shape of a drawing area is a triangle, a rotated rectangle, or an ellipse is split, according to a maximum inscribed rectangle, into one regular drawing command and several new irregular drawing commands; several new regular drawing commands are obtained after intersection detection is performed on the regular drawing command that is obtained after the splitting; one or more of the several new regular drawing commands may be combined in a command combining operation, which can improve an effect of overdraw elimination to some extent.

Optionally, in another embodiment, step S1730 is implemented as follows: when the drawing area corresponding to the irregular drawing command is an irregular polygon, segmenting a drawing area of the irregular polygon into multiple triangular drawing areas, and splitting the irregular drawing command into multiple third-class drawing commands according to a segmentation method of the irregular polygon, where the multiple third-class drawing commands are in one-to-one correspondence with the multiple triangular drawing areas; for each third-class drawing command, acquiring maximum inscribed rectangle information of the third-class drawing command according to bounding rectangle information and drawing area information of the third-class drawing command; and splitting the third-class drawing command into the one first-class drawing command and the at least one second-class drawing command using the bounding rectangle information and the maximum inscribed rectangle information of the third-class drawing command, where the drawing area corresponding to the first-class drawing command is a maximum inscribed rectangle corresponding to the third-class drawing command, and the drawing area corresponding to the at least one second-class drawing command is a corner area obtained after the maximum inscribed rectangle is subtracted from a drawing area corresponding to the third-class drawing command.

In this embodiment of the present disclosure, an irregular polygon is split into multiple triangles, and then each triangle is split into one maximum inscribed rectangle and three corner areas; an original drawing command is split into multiple regular drawing commands and multiple new irregular drawing commands according to areas obtained after the splitting; several new regular drawing commands are obtained after intersection detection is performed on the regular drawing commands that are obtained after the splitting; one or more of the several new regular drawing commands may be combined in a command combining operation, which can improve an effect of overdraw elimination to some extent.

Optionally, step S1740 is implemented as follows: grouping, into multiple drawing command sets according to the bounding rectangle information and the drawing area information using an R+ tree algorithm, a regular drawing command in the multiple drawing commands, and the at least one first-class drawing command and the at least one second-class drawing command that are obtained after the irregular drawing command in the multiple drawing commands is split, so that drawing commands that belong to different drawing command sets do not intersect with each other.

In this embodiment of the present disclosure, an R+ tree algorithm is used, so that drawing command grouping can be performed rapidly, and each drawing command set obtained after the grouping is controlled in a specific scale, thereby reducing time complexity of intersection detection, and improving graphics processing efficiency of a graphics processing apparatus to a great extent.

Figure 18:
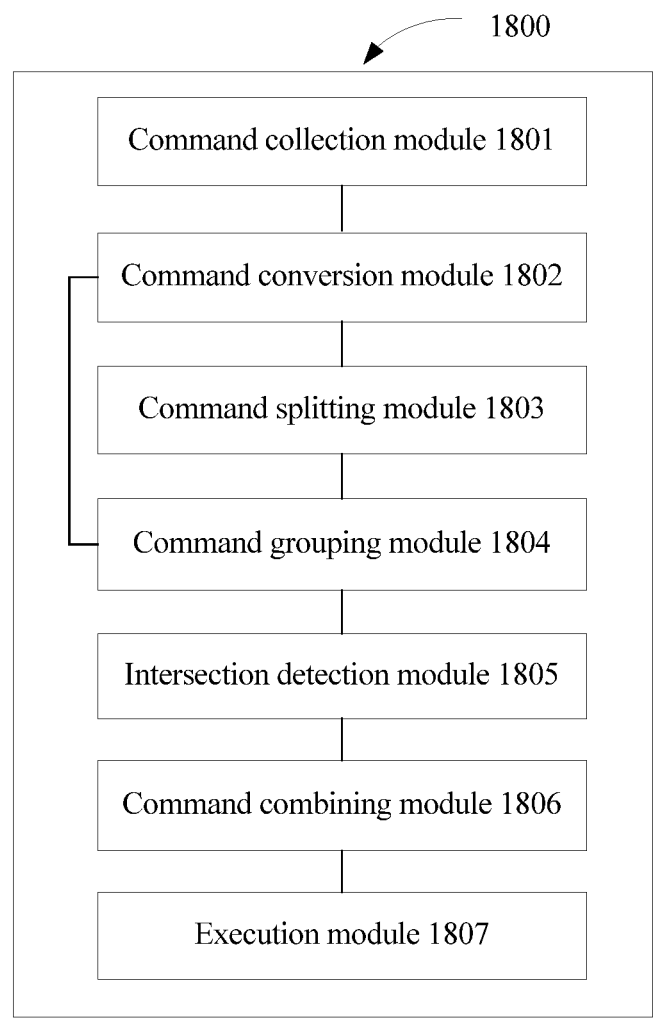
FIG. 18 is a schematic structural diagram of another graphics processing apparatus according to an embodiment of the present disclosure.

FIG. 18 is a schematic structural diagram of a graphics processing apparatus 1800 according to an embodiment of the present disclosure. As shown in FIG. 18, the graphics processing apparatus 1800 may include a command collection module 1801, a command conversion module 1802, a command splitting module 1803, a command grouping module 1804, an intersection detection module 1805, a command combining module 1806, and an execution module 1807.

The command collection module 1801 is configured to receive a command queue input by a current frame, where the command queue includes multiple API commands.

The command conversion module 1802 is configured to convert the multiple API commands to multiple drawing commands, where each drawing command carries bounding rectangle information, execution content, a drawing mode, and drawing area information, and the drawing mode includes an opaque mode, a blend mode, or a wait mode.

The command splitting module 1803 is configured to split, according to the bounding rectangle information and the drawing area information, each irregular drawing command in the multiple drawing commands into at least one first-class drawing command and at least one second-class drawing command, where a drawing area of the at least one first-class drawing command is a rectangle in a drawing area corresponding to the irregular drawing command, a drawing area of the at least one second-class drawing command is a remaining corner area obtained after the drawing area of the at least one first-class drawing command is subtracted from the drawing area corresponding to the irregular drawing command, a drawing mode of the at least one first-class drawing command is the same as a drawing mode of the irregular drawing command, and a drawing mode of the at least one second-class drawing command is the wait mode.

The command grouping module 1804 is configured to group, into multiple drawing command sets according to the bounding rectangle information and the drawing area information, a regular drawing command in the multiple drawing commands, and the at least one first-class drawing command and the at least one second-class drawing command that are obtained after the irregular drawing command in the multiple drawing commands is split, so that drawing commands that belong to different drawing command sets do not intersect with each other.

The intersection detection module 1805 is configured to separately perform intersection detection on the multiple drawing command sets according to the bounding rectangle information and the drawing area information, so that drawing commands in each drawing command set in the multiple drawing command sets do not intersect with each other.

The command combining module 1806 is configured to separately perform, according to the execution content, the drawing mode, and the drawing area information, drawing command combining on the multiple drawing command sets on which the intersection detection is performed.

The execution module 1807 is configured to execute a drawing command obtained after combining is performed on each drawing command set.

In this embodiment of the present disclosure, the graphics processing apparatus 1800 converts multiple API commands in a command queue of a current frame into multiple drawing commands, and splits an irregular drawing command in the multiple drawing commands into a regular drawing command and an irregular drawing command according to a drawing area; groups, into multiple drawing command sets that do not intersect with each other, a regular drawing command that exists before the splitting and the regular drawing command and irregular drawing command that are obtained after the splitting; and then separately performs intersection detection and command combining on each drawing command set. Drawing commands are grouped into multiple drawing command sets, and then intersection detection is performed, which can greatly reduce a time for intersection detection. In addition, original irregular drawing commands are split into regular drawing commands and irregular drawing commands, several new regular drawing commands are obtained after intersection detection is performed on the regular drawing commands that are obtained after the splitting, and one or more of the several new regular drawing commands may be combined in a command combining operation, which can improve an effect of overdraw elimination to some extent. Therefore, graphics processing performance can be improved.

Optionally, in an embodiment, the command splitting module 1803 is configured to acquire maximum inscribed rectangle information of the irregular drawing command according to bounding rectangle information and drawing area information of the irregular drawing command; and split the irregular drawing command into the one first-class drawing command and the at least one second-class drawing command using the bounding rectangle information and the maximum inscribed rectangle information of the irregular drawing command, where the drawing area corresponding to the first-class drawing command is a maximum inscribed rectangle corresponding to the irregular drawing command, and the drawing area corresponding to the at least one second-class drawing command is a corner area obtained after the maximum inscribed rectangle is subtracted from the drawing area corresponding to the irregular drawing command.

In this embodiment of the present disclosure, the graphics processing apparatus 1800 splits, according to a maximum inscribed rectangle, an original irregular command of which a shape of a drawing area is a triangle, a rotated rectangle, or an ellipse into one regular drawing command and several new irregular drawing commands; several new regular drawing commands are obtained after intersection detection is performed on the regular drawing command that is obtained after the splitting; one or more of the several new regular drawing commands may be combined in a command combining operation, which can improve an effect of overdraw elimination to some extent.

Optionally, in another embodiment, the command splitting module 1803 is configured to, when the drawing area corresponding to the irregular drawing command is an irregular polygon, segment a drawing area of the irregular polygon into multiple triangular drawing areas, and split the irregular drawing command into multiple third-class drawing commands according to a segmentation method of the irregular polygon, where the multiple third-class drawing commands are in one-to-one correspondence with the multiple triangular drawing areas; for each third-class drawing command, acquire maximum inscribed rectangle information of the third-class drawing command according to bounding rectangle information and drawing area information of the third-class drawing command; and split the third-class drawing command into the one first-class drawing command and the at least one second-class drawing command using the bounding rectangle information and the maximum inscribed rectangle information of the third-class drawing command, where the drawing area corresponding to the first-class drawing command is a maximum inscribed rectangle corresponding to the third-class drawing command, and the drawing area corresponding to the at least one second-class drawing command is a corner area obtained after the maximum inscribed rectangle is subtracted from a drawing area corresponding to the third-class drawing command.

In this embodiment of the present disclosure, the graphics processing apparatus 1800 splits an irregular polygon into multiple triangles, and then splits each triangle into one maximum inscribed rectangle and three corner areas; and splits an original drawing command into multiple regular drawing commands and multiple new irregular drawing commands according to areas obtained after the splitting; several new regular drawing commands are obtained after intersection detection is performed on the regular drawing commands that are obtained after the splitting; one or more of the several new regular drawing commands may be combined in a command combining operation, which can improve an effect of overdraw elimination to some extent.

Optionally, the command grouping module 1804 is configured to group, into multiple drawing command sets according to the bounding rectangle information and the drawing area information using an R+ tree algorithm, a regular drawing command in the multiple drawing commands, and the at least one first-class drawing command and the at least one second-class drawing command that are obtained after the irregular drawing command in the multiple drawing commands is split, so that drawing commands that belong to different drawing command sets do not intersect with each other.

In this embodiment of the present disclosure, the graphics processing apparatus 1800 can rapidly perform drawing command grouping using an R+ tree algorithm, and each drawing command set obtained after the grouping is controlled in a specific scale, thereby reducing time complexity of intersection detection, and improving graphics processing efficiency of the graphics processing apparatus to a great extent.

In addition, the graphics processing apparatus 1800 may further execute a method of FIG. 17, and implement functions of the graphics processing apparatus in the embodiment shown in FIG. 17. Details are not described in this embodiment of the present disclosure.

In the foregoing multiple embodiments of the graphics processing apparatus, it should be understood that, in an implementation manner, a command collection module may be implemented using a communications interface, and a command splitting module, a command grouping module, an intersection detection module, a command combining module, and an execution module may be implemented by executing, by a processor, a program or an instruction in a storage (in other words, the processor cooperates with a special instruction in the storage to which the processor is coupled, to implement the command splitting module, the command grouping module, the intersection detection module, the command combining module, and the execution module). In another implementation manner, the command collection module, the command splitting module, the command grouping module, the intersection detection module, the command combining module, and the execution module may be separately implemented using an ASIC. For a specific implementation manner, reference may be made to the prior art, and details are not described herein. The present disclosure includes but is not limited to the foregoing implementation manners, and it should be understood that, solutions implemented according to the ideas of the present disclosure shall fall within the protection scope of the embodiments of the present disclosure.

Figure 19:
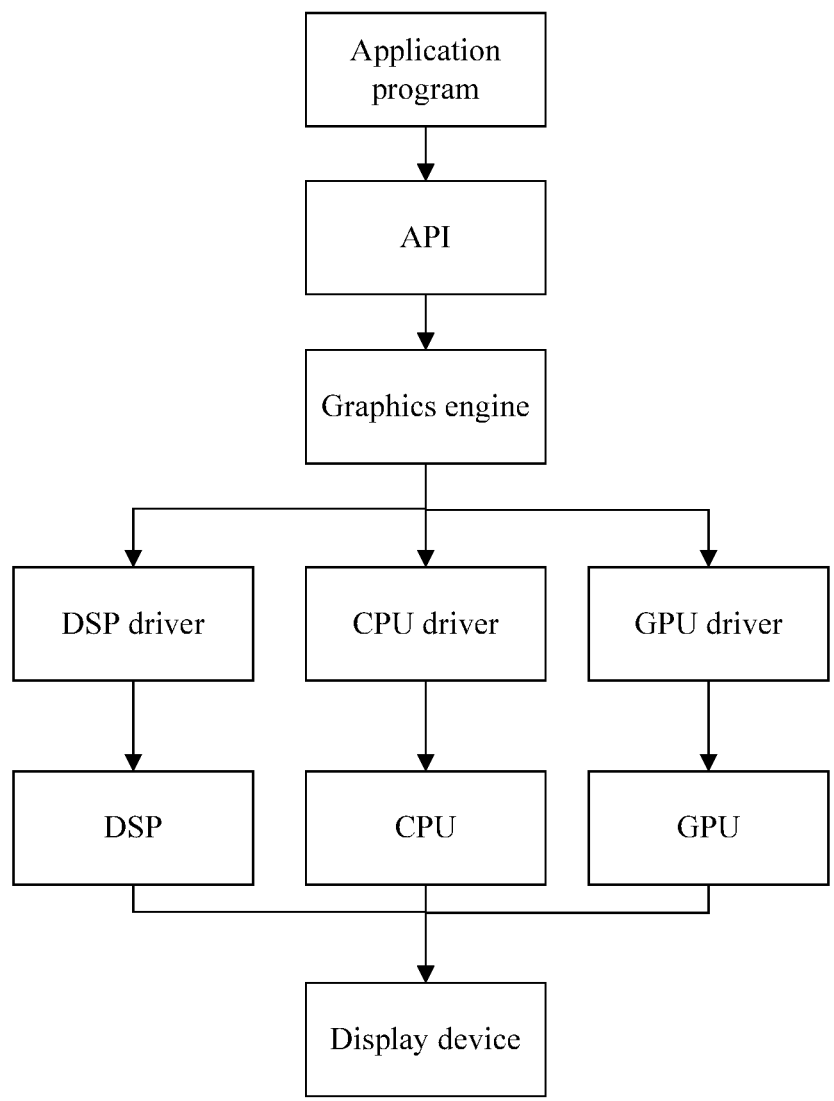
FIG. 19 is another specific schematic flowchart of graphics processing according to an embodiment of the present disclosure.

A specific application method of the graphics processing apparatus in this embodiment of the present disclosure is shown in FIG. 19. FIG. 19 is a specific schematic flowchart of graphics processing according to an embodiment of the present disclosure. In FIG. 19, an application program is a user-oriented product, and requires, for running, support of an entity having a capability of graphics processing. The application program may be an online game, a CAD cartography tool, or the like. The graphics processing apparatus 1800 may correspond to an implementation manner of a combination of software and hardware: a graphics engine, a processor driver, and a processor shown in FIG. 19 (it should be understood that, the graphics engine and the processor driver herein may be understood as a program or an instruction stored in a memory). After a drawing command output by the application program is processed by the graphics engine, a series of new drawing commands are obtained; the graphics engine sends, using the processor driver, the series of new drawing commands that are obtained after the processing to a corresponding processor (for example, the graphics engine sends, using a DSP Driver, the series of new drawing commands that are obtained after the processing to a DSP, or to a CPU using a CPU driver, or to a GPU using a GPU driver), and then the processor (such as the DSP, the CPU, or the GPU) executes the series of new drawing commands that are obtained after the processing, and outputs a final rendering result to a display device (such as a display unit shown in FIG. 20).

Figure 20:
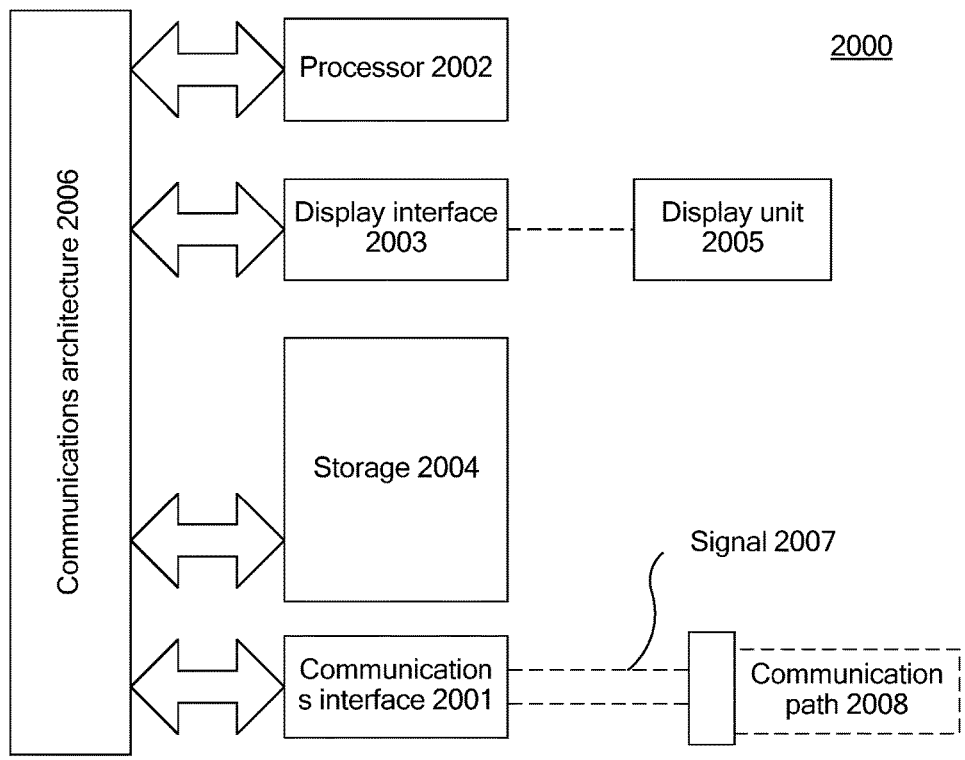
FIG. 20 is a schematic structural diagram of another computer system according to an embodiment of the present disclosure.

The following describes an exemplary implementation manner of a graphics processing apparatus with reference to FIG. 20. For ease of description, the graphics processing apparatus in the following embodiment is collectively referred to as a computer system.

FIG. 20 is a schematic structural diagram of a computer system 2000 according to an embodiment of the present disclosure. An embodiment of the present disclosure is shown in FIG. 20, and the computer system 2000 may include a processor 2002, a storage 2004, a communications interface 2001, and a display interface 2003.

The processor 2002, the storage 2004, the communications interface 2001, and the display interface 2003 are connected to each other using a communications architecture 2006, where the communications architecture 2006 may be a bus, a network, or the like. When the communications architecture 2006 is a bus, the bus may be an ISA bus, a PCI bus, an EISA bus, or the like. The bus may be classified into an address bus, a data bus, a control bus, and the like. When the communications architecture 2006 is a network, the network may be a wired network such as a fiber network or a telephone line, or a wireless network such as a cell connection, a radio frequency connection, or another communications channel.

The display interface 2003 may be connected to a display unit 2005. The display unit 2005 includes a display (such as a touchscreen, an LCD, a CRT, a Holographic, or a projector). The display interface 2003 is configured to output display data of the computer system 2000 to the display unit 2005, and the display unit 2005 displays the display data of the computer system 2000. The storage 2004 may further include a frame buffer, and the computer system 2000 processes the display data in the frame buffer; after the display data is processed, the computer system 2000 outputs data of the frame buffer to the display unit 2005 using the display interface 2003. The display unit 2005 may be configured to display information input by a user or information provided for a user, and various menu interfaces of a device (such as a mobile terminal, a computer, an intelligent set-top box, or an intelligent all-in-one machine) in which the graphics processing apparatus is located. The display unit 2005 may include a display panel, and optionally, the display panel may be configured in a form of an LCD, an OLED, or the like. Optionally, the display unit 2005 may further include a touch panel, and the touch panel covers the display panel, to form a touch display screen.

The communications interface 2001 is configured to implement communication between the computer system 2000 and an external device of the computer system 2000. The communications interface 2001 may convert data of the computer system 2000 into a signal 2007, and send the signal 2007 through a communication path 2008; or receive a signal 2007 from a communication path 2008, and convert the signal 2007 into data. The communications interface 2001 may be a modem, a network interface (such as an Ethernet interface), a communication port, a PCMCIA expansion slot, a PCMCIA expansion card, or the like. The signal 2007 may be an optical signal, an electrical signal, or a signal in another form. The communication path 2008 may be a fiber network, a telephone line, a cell connection, a radio frequency connection, or another communications channel.

The storage 2004 is configured to store a program. The program may include program code, and the program code includes a computer operation instruction. The storage 2004 may include a read-only memory and a random access memory, and provides an instruction and data for the processor 2002. The storage 2004 may include a high-speed RAM, and may further include a non-volatile memory (non-volatile memory), such as at least one magnetic disk memory.

The processor 2002 executes the program stored in the storage 2004 and is configured to perform the following operations: receiving a command queue input by a current frame, where the command queue includes multiple API commands; converting the multiple API commands to multiple drawing commands, where each drawing command carries bounding rectangle information, execution content, a drawing mode, and drawing area information, and the drawing mode includes an opaque mode, a blend mode, or a wait mode; splitting, according to the bounding rectangle information and the drawing area information, each irregular drawing command in the multiple drawing commands into at least one first-class drawing command and at least one second-class drawing command, where a drawing area of the at least one first-class drawing command is a rectangle in a drawing area corresponding to the irregular drawing command, a drawing area of the at least one second-class drawing command is a remaining corner area obtained after the drawing area of the at least one first-class drawing command is subtracted from the drawing area corresponding to the irregular drawing command, a drawing mode of the at least one first-class drawing command is the same as a drawing mode of the irregular drawing command, and a drawing mode of the at least one second-class drawing command is the wait mode; grouping, into multiple drawing command sets according to the bounding rectangle information and the drawing area information, a regular drawing command in the multiple drawing commands, and the at least one first-class drawing command and the at least one second-class drawing command that are obtained after the irregular drawing command in the multiple drawing commands is split, so that drawing commands that belong to different drawing command sets do not intersect with each other; separately performing intersection detection on the multiple drawing command sets according to the bounding rectangle information and the drawing area information, so that drawing commands in each drawing command set in the multiple drawing command sets do not intersect with each other; separately performing, according to the execution content, the drawing mode, and the drawing area information, drawing command combining on the multiple drawing command sets on which the intersection detection is performed; and executing a drawing command obtained after combining is performed on each drawing command set.

The foregoing method that is executed by a graphics processing apparatus and disclosed in the embodiment of FIG. 17 of the present disclosure may be applied to the processor 2002 or implemented by the processor 2002. In this embodiment of the present disclosure, the computer system 2000 may include one or more processors 2002. The processor 2002 may be an integrated circuit chip and has a signal processing capability. In an implementation process, steps in the foregoing method may be completed by means of an integrated logic circuit of hardware in the processor 2002 or an instruction in a form of software. The foregoing processor 2002 may be a general purpose processor, including a CPU, a NP), and the like, and may further be a DSP, an ASIC, a FPGA, or another programmable logic device, discrete gate or transistor logic device, or discrete hardware component, or a dedicated processor, such as a GPU. The processor 2002 may implement or execute methods, steps, and logical block diagrams disclosed in the embodiments of the present disclosure. The general purpose processor may be a microprocessor, or the processor may be any conventional processor or the like. Steps of the methods disclosed with reference to the embodiments of the present disclosure may be directly executed and completed by means of a hardware decoding processor, or may be executed and completed using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the storage 2004, and the processor 2002 reads information in the storage 2004 and completes the steps in the foregoing method in combination with hardware of the processor 2002.

In this embodiment of the present disclosure, the computer system 2000 converts multiple API commands in a command queue of a current frame into multiple drawing commands, and splits an irregular drawing command in the multiple drawing commands into a regular drawing command and an irregular drawing command according to a drawing area; groups, into multiple drawing command sets that do not intersect with each other, a regular drawing command that exists before the splitting and the regular drawing command and irregular drawing command that are obtained after the splitting; and then separately performs intersection detection and command combining on each drawing command set. Drawing commands are grouped into multiple drawing command sets, and then intersection detection is performed, which can greatly reduce a time for intersection detection. In addition, original irregular drawing commands are split into regular drawing commands and irregular drawing commands, several new regular drawing commands are obtained after intersection detection is performed on the regular drawing commands that are obtained after the splitting, and one or more of the several new regular drawing commands may be combined in a command combining operation, which can improve an effect of overdraw elimination to some extent. Therefore, graphics processing performance can be improved.

Optionally, in an embodiment, in a process of splitting, according to the bounding rectangle information and the drawing area information, each irregular drawing command in the multiple drawing commands into at least one first-class drawing command and at least one second-class drawing command, the processor 2002 is configured to acquire maximum inscribed rectangle information of the irregular drawing command according to bounding rectangle information and drawing area information of the irregular drawing command; and split the irregular drawing command into the one first-class drawing command and the at least one second-class drawing command using the bounding rectangle information and the maximum inscribed rectangle information of the irregular drawing command, where the drawing area corresponding to the first-class drawing command is a maximum inscribed rectangle corresponding to the irregular drawing command, and the drawing area corresponding to the at least one second-class drawing command is a corner area obtained after the maximum inscribed rectangle is subtracted from the drawing area corresponding to the irregular drawing command.

In this embodiment of the present disclosure, the computer system 2000 splits, according to a maximum inscribed rectangle, an original irregular command of which a shape of a drawing area is a triangle, a rotated rectangle, or an ellipse into one regular drawing command and several new irregular drawing commands; several new regular drawing commands are obtained after intersection detection is performed on the regular drawing command that is obtained after the splitting; one or more of the several new regular drawing commands may be combined in a command combining operation, which can improve an effect of overdraw elimination to some extent.

Optionally, in another embodiment, in a process of splitting, according to the bounding rectangle information and the drawing area information, each irregular drawing command in the multiple drawing commands into at least one first-class drawing command and at least one second-class drawing command, the processor 2002 is configured to, when the drawing area corresponding to the irregular drawing command is an irregular polygon, segment a drawing area of the irregular polygon into multiple triangular drawing areas, and split the irregular drawing command into multiple third-class drawing commands according to a segmentation method of the irregular polygon, where the multiple third-class drawing commands are in one-to-one correspondence with the multiple triangular drawing areas; for each third-class drawing command, acquire maximum inscribed rectangle information of the third-class drawing command according to bounding rectangle information and drawing area information of the third-class drawing command; and split the third-class drawing command into the one first-class drawing command and the at least one second-class drawing command using the bounding rectangle information and the maximum inscribed rectangle information of the third-class drawing command, where the drawing area corresponding to the first-class drawing command is a maximum inscribed rectangle corresponding to the third-class drawing command, and the drawing area corresponding to the at least one second-class drawing command is a corner area obtained after the maximum inscribed rectangle is subtracted from a drawing area corresponding to the third-class drawing command.

In this embodiment of the present disclosure, the computer system 2000 splits, according to a maximum inscribed rectangle, an original irregular command of which a shape of a drawing area is a triangle, a rotated rectangle, or an ellipse into one regular drawing command and several new irregular drawing commands; several new regular drawing commands are obtained after intersection detection is performed on the regular drawing command that is obtained after the splitting; one or more of the several new regular drawing commands may be combined in a command combining operation, which can improve an effect of overdraw elimination to some extent.

Optionally, the processor 2002 is configured to group, into multiple drawing command sets according to the bounding rectangle information and the drawing area information using an R+ tree algorithm, a regular drawing command in the multiple drawing commands, and the at least one first-class drawing command and the at least one second-class drawing command that are obtained after the irregular drawing command in the multiple drawing commands is split, so that drawing commands that belong to different drawing command sets do not intersect with each other.

In this embodiment of the present disclosure, the computer system 2000 splits an irregular polygon into multiple triangles, and then splits each triangle into one maximum inscribed rectangle and three corner areas; and splits an original drawing command into multiple regular drawing commands and multiple new irregular drawing commands according to areas obtained after the splitting; several new regular drawing commands are obtained after intersection detection is performed on the regular drawing commands that are obtained after the splitting; one or more of the several new regular drawing commands may be combined in a command combining operation, which can improve an effect of overdraw elimination to some extent.

In addition, the computer system 2000 may further execute a method of FIG. 17, and implement functions of the graphics processing apparatus in the embodiment shown in FIG. 17. Details are not described in this embodiment of the present disclosure.

Figure 21:
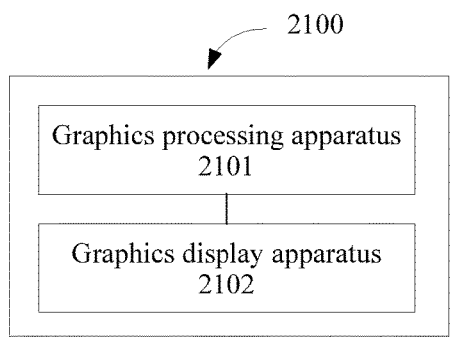
FIG. 21 is a schematic structural diagram of a graphics display system according to an embodiment of the present disclosure.

FIG. 21 is a schematic structural diagram of a graphics display system 2100 according to an embodiment of the present disclosure. As shown in FIG. 21, the graphics display system 2100 may include a graphics processing apparatus 2101 and a graphics display apparatus 2102.

The graphics processing apparatus 2101 may be the graphics processing apparatus 1400 shown in the embodiment of FIG. 14.

The graphics display apparatus 2102 is communicatively connected to the graphics processing apparatus 2101 and configured to display a graph obtained after the graphics processing apparatus executes a combined drawing command.

In this embodiment of the present disclosure, the graphics display system 2100 splits an irregular drawing command in a command queue of a current frame into a regular drawing command and an irregular drawing command according to a drawing area; groups, into multiple drawing command sets that do not intersect with each other, a regular drawing command that exists before the splitting and the regular drawing command and irregular drawing command that are obtained after the splitting; and then separately performs intersection detection and command combining on each drawing command set. Drawing commands are grouped into multiple drawing command sets, and then intersection detection is performed, which can greatly reduce a time for intersection detection. In addition, original irregular drawing commands are split into regular drawing commands and irregular drawing commands, several new regular drawing commands are obtained after intersection detection is performed on the regular drawing commands that are obtained after the splitting, and one or more of the several new regular drawing commands may be combined in a command combining operation, which can improve an effect of overdraw elimination to some extent. Therefore, graphics processing performance can be improved.

Figure 22:
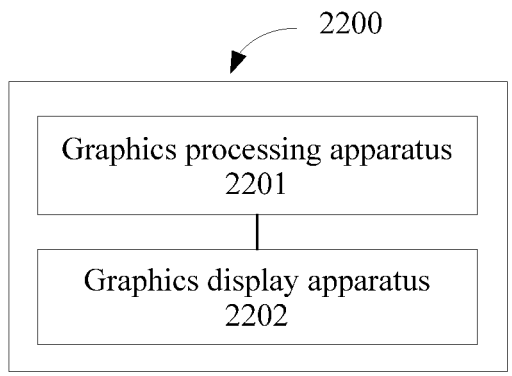
FIG. 22 is a schematic structural diagram of another graphics display system according to an embodiment of the present disclosure.

FIG. 22 is a schematic structural diagram of a graphics display system 2200 according to an embodiment of the present disclosure. As shown in FIG. 22, the graphics display system 2200 may include a graphics processing apparatus 2201 and a graphics display apparatus 2202.

The graphics processing apparatus 2201 may be the graphics processing apparatus 1800 shown in the embodiment of FIG. 18.

The graphics display apparatus 2202 is communicatively connected to the graphics processing apparatus 2201 and configured to display a graph obtained after the graphics processing apparatus executes a combined drawing command.

In this embodiment of the present disclosure, the graphics display system 2200 converts multiple API commands in a command queue of a current frame into multiple drawing commands, and splits an irregular drawing command in the multiple drawing commands into a regular drawing command and an irregular drawing command according to a drawing area; groups, into multiple drawing command sets that do not intersect with each other, a regular drawing command that exists before the splitting and the regular drawing command and irregular drawing command that are obtained after the splitting; and then separately performs intersection detection and command combining on each drawing command set. Drawing commands are grouped into multiple drawing command sets, and then intersection detection is performed, which can greatly reduce a time for intersection detection. In addition, original irregular drawing commands are split into regular drawing commands and irregular drawing commands, several new regular drawing commands are obtained after intersection detection is performed on the regular drawing commands that are obtained after the splitting, and one or more of the several new regular drawing commands may be combined in a command combining operation, which can improve an effect of overdraw elimination to some extent. Therefore, graphics processing performance can be improved.

Figure 23:
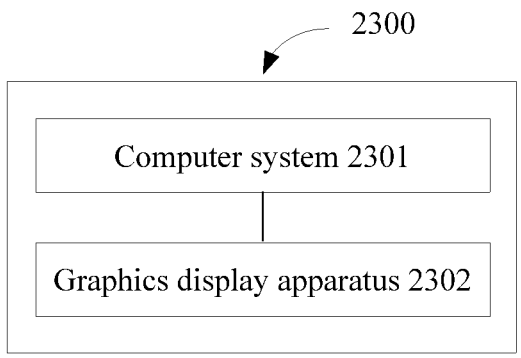
FIG. 23 is a schematic structural diagram of still another graphics display system according to an embodiment of the present disclosure.

FIG. 23 is a schematic structural diagram of a graphics display system 2300 according to an embodiment of the present disclosure. As shown in FIG. 23, the graphics display system 2300 may include a computer system 2301 and a graphics display apparatus 2302.

The computer system 2301 may be the computer system 1600 shown in the embodiment of FIG. 16.

The graphics display apparatus 2302 is communicatively connected to the computer system 2301 and configured to display a graph obtained after the computer system executes a combined drawing command.

In this embodiment of the present disclosure, the graphics display system 2300 splits an irregular drawing command in a command queue of a current frame into a regular drawing command and an irregular drawing command according to a drawing area; groups, into multiple drawing command sets that do not intersect with each other, a regular drawing command that exists before the splitting and the regular drawing command and irregular drawing command that are obtained after the splitting; and then separately performs intersection detection and command combining on each drawing command set. Drawing commands are grouped into multiple drawing command sets, and then intersection detection is performed, which can greatly reduce a time for intersection detection. In addition, original irregular drawing commands are split into regular drawing commands and irregular drawing commands, several new regular drawing commands are obtained after intersection detection is performed on the regular drawing commands that are obtained after the splitting, and one or more of the several new regular drawing commands may be combined in a command combining operation, which can improve an effect of overdraw elimination to some extent. Therefore, graphics processing performance can be improved.

Figure 24:
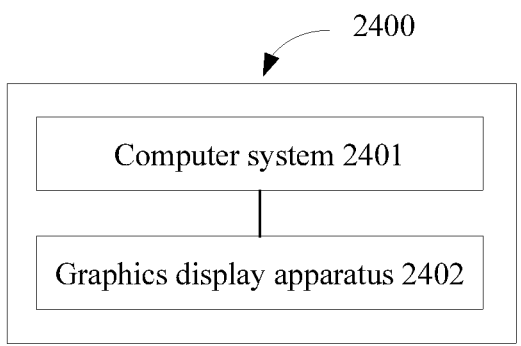
FIG. 24 is a schematic structural diagram of yet another graphics display system according to an embodiment of the present disclosure.

FIG. 24 is a schematic structural diagram of a graphics display system 2400 according to an embodiment of the present disclosure. As shown in FIG. 24, the graphics display system 2400 may include a computer system 2401 and a graphics display apparatus 2402.

The computer system 2401 may be the computer system 2000 shown in the embodiment of FIG. 20.

The graphics display apparatus 2402 is communicatively connected to the computer system 2401 and configured to display a graph obtained after the computer system executes a combined drawing command.

In this embodiment of the present disclosure, the graphics display system 2400 converts multiple API commands in a command queue of a current frame into multiple drawing commands, and splits an irregular drawing command in the multiple drawing commands into a regular drawing command and an irregular drawing command according to a drawing area; groups, into multiple drawing command sets that do not intersect with each other, a regular drawing command that exists before the splitting and the regular drawing command and irregular drawing command that are obtained after the splitting; and then separately performs intersection detection and command combining on each drawing command set. Drawing commands are grouped into multiple drawing command sets, and then intersection detection is performed, which can greatly reduce a time for intersection detection. In addition, original irregular drawing commands are split into regular drawing commands and irregular drawing commands, several new regular drawing commands are obtained after intersection detection is performed on the regular drawing commands that are obtained after the splitting, and one or more of the several new regular drawing commands may be combined in a command combining operation, which can improve an effect of overdraw elimination to some extent. Therefore, graphics processing performance can be improved.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in the form of a software product. The computer software product is stored in a storage medium and includes several instructions for instructing a computer device (which may be a personal computer, a server, or a network device, and may be, for example, a processor in a computer device) to execute all or some of the steps of the foregoing methods described in the embodiments of the present disclosure. The foregoing storage medium includes any medium that can store program code, such as a universal serial bus (USB) flash drive, a removable hard disk, a read-only memory (ROM), a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A graphics processing method, comprising:
receiving a command queue for a current frame, the command queue comprising multiple drawing commands, each drawing command carrying bounding rectangle information, execution content, a drawing mode, and drawing area information, and the drawing mode comprising an opaque mode, a blend mode, or a wait mode;
splitting, according to the bounding rectangle information and the drawing area information, each irregular drawing command in the multiple drawing commands into at least one first-class drawing command and at least one second-class drawing command, the irregular drawing command referring to a drawing command corresponding to a drawing area of an irregular shape, the irregular shape refers to all shapes except a regular shape and the regular shape refers to a rectangle whose edges are in parallel with edges corresponding to a display desktop, a drawing area of the at least one first-class drawing command being a rectangle in a drawing area corresponding to the irregular drawing command, a drawing area of the at least one second-class drawing command being a remaining corner area obtained after the drawing area of the at least one first-class drawing command is subtracted from the drawing area corresponding to the irregular drawing command, a drawing mode of the at least one first-class drawing command being the same as a drawing mode of the irregular drawing command, and a drawing mode of the at least one second-class drawing command being the wait mode;
grouping, into multiple drawing command sets according to the bounding rectangle information and the drawing area information, a regular drawing command in the multiple drawing commands, the at least one first-class drawing command and the at least one second-class drawing command that are obtained after the irregular drawing command in the multiple drawing commands being split, so that drawing commands that belong to different drawing command sets do not intersect with each other;
separately performing intersection detection on the multiple drawing command sets according to the bounding rectangle information and the drawing area information, so that drawing commands in each drawing command set in the multiple drawing command sets do not intersect with each other;
separately performing, according to the execution content, the drawing mode, and the drawing area information, a drawing command combining on the multiple drawing command sets on which the intersection detection is performed; and
executing the drawing command obtained after combining is performed on each drawing command set.

2. The method according to claim 1, wherein splitting, according to the bounding rectangle information and the drawing area information, each irregular drawing command in the multiple drawing commands into the at least one first-class drawing command and the at least one second-class drawing command comprises:
acquiring maximum inscribed rectangle information of the irregular drawing command according to bounding rectangle information and drawing area information of the irregular drawing command; and
splitting the irregular drawing command into the one first-class drawing command and the at least one second-class drawing command using the bounding rectangle information and the maximum inscribed rectangle information of the irregular drawing command, the area corresponding to the first-class drawing command being a maximum inscribed rectangle corresponding to the irregular drawing command, and the drawing area corresponding to the at least one second-class drawing command being a corner area obtained after the maximum inscribed rectangle is subtracted from the drawing area corresponding to the irregular drawing command.

3. The method according to claim 1, wherein splitting, according to the bounding rectangle information and the drawing area information, each irregular drawing command in the multiple drawing commands into the at least one first-class drawing command and the at least one second-class drawing command comprises:
segmenting a drawing area of an irregular polygon into multiple triangular drawing areas when the drawing area corresponding to the irregular drawing command is the irregular polygon;
splitting the irregular drawing command into multiple third-class drawing commands according to a segmentation method of the irregular polygon, the multiple third-class drawing commands being in one-to-one correspondence with the multiple triangular drawing areas;
acquiring, for each third-class drawing command, maximum inscribed rectangle information of the third-class drawing command according to bounding rectangle information and drawing area information of the third-class drawing command; and splitting the third-class drawing command into the one first-class drawing command and the at least one second-class drawing command using the bounding rectangle information and the maximum inscribed rectangle information of the third-class drawing command, the drawing area corresponding to the first-class drawing command being a maximum inscribed rectangle corresponding to the third-class drawing command, and the drawing area corresponding to the at least one second-class drawing command being a corner area obtained after the maximum inscribed rectangle is subtracted from a drawing area corresponding to the third-class drawing command.

4. A graphics processing method, comprising:
receiving a command queue for a current frame, the command queue comprising multiple application programming interface (API) commands;
converting the multiple API commands to multiple drawing commands, each drawing command carrying bounding rectangle information, execution content, a drawing mode, and drawing area information, and the drawing mode comprising an opaque mode, a blend mode, or a wait mode;
splitting, according to the bounding rectangle information and the drawing area information, each irregular drawing command in the multiple drawing commands into at least one first-class drawing command and at least one second-class drawing command, the irregular drawing command referring to a drawing command corresponding to a drawing area of an irregular shape, the irregular shape refers to all shapes except a regular shape and the regular shape refers to a rectangle whose edges are in parallel with edges corresponding to a display desktop, a drawing area of the at least one first-class drawing command being a rectangle in a drawing area corresponding to the irregular drawing command, a drawing area of the at least one second-class drawing command being a remaining corner area obtained after the drawing area of the at least one first-class drawing command is subtracted from the drawing area corresponding to the irregular drawing command, a drawing mode of the at least one first-class drawing command being the same as a drawing mode of the irregular drawing command, and a drawing mode of the at least one second-class drawing command being the wait mode;
grouping, into multiple drawing command sets according to the bounding rectangle information and the drawing area information, a regular drawing command in the multiple drawing commands, and the at least one first-class drawing command and the at least one second-class drawing command that are obtained after the irregular drawing command in the multiple drawing commands being split, so that drawing commands that belong to different drawing command sets do not intersect with each other;
separately performing intersection detection on the multiple drawing command sets according to the bounding rectangle information and the drawing area information, so that drawing commands in each drawing command set in the multiple drawing command sets do not intersect with each other;
separately performing, according to the execution content, the drawing mode, and the drawing area information, a drawing command combining on the multiple drawing command sets on which the intersection detection is performed; and
executing the drawing command obtained after combining is performed on each drawing command set.

5. The method according to claim 4, wherein splitting, according to the bounding rectangle information and the drawing area information, each irregular drawing command in the multiple drawing commands into the at least one first-class drawing command and the at least one second-class drawing command comprises:
acquiring maximum inscribed rectangle information of the irregular drawing command according to bounding rectangle information and drawing area information of the irregular drawing command; and
splitting the irregular drawing command into the one first-class drawing command and the at least one second-class drawing command using the bounding rectangle information and the maximum inscribed rectangle information of the irregular drawing command, the drawing area corresponding to the first-class drawing command being a maximum inscribed rectangle corresponding to the irregular drawing command, and the drawing area corresponding to the at least one second-class drawing command being a corner area obtained after the maximum inscribed rectangle is subtracted from the drawing area corresponding to the irregular drawing command.

6. The method according to claim 4, wherein splitting, according to the bounding rectangle information and the drawing area information, each irregular drawing command in the multiple drawing commands into the at least one first-class drawing command and the at least one second-class drawing command comprises:
segmenting a drawing area of an irregular polygon into multiple triangular drawing areas when the drawing area corresponding to the irregular drawing command is the irregular polygon;
splitting the irregular drawing command into multiple third-class drawing commands according to a segmentation method of the irregular polygon, the multiple third-class drawing commands being in one-to-one correspondence with the multiple triangular drawing areas;
acquiring, for each third-class drawing command, maximum inscribed rectangle information of the third-class drawing command according to bounding rectangle information and drawing area information of the third-class drawing command; and
splitting the third-class drawing command into the one first-class drawing command and the at least one second-class drawing command using the bounding rectangle information and the maximum inscribed rectangle information of the third-class drawing command, the drawing area corresponding to the first-class drawing command being a maximum inscribed rectangle corresponding to the third-class drawing command, and the drawing area corresponding to the at least one second-class drawing command being a corner area obtained after the maximum inscribed rectangle is subtracted from a drawing area corresponding to the third-class drawing command.

7. A graphics processing apparatus, comprising:
a memory storing executable instructions; and
a processor coupled to the memory and configured to:
receive a command queue for a current frame, the command queue comprising multiple drawing commands, each drawing command carries bounding rectangle information, execution content, a drawing mode, and drawing area information, and the drawing mode comprises an opaque mode, a blend mode, or a wait mode;

split, according to the bounding rectangle information and the drawing area information, each irregular drawing command in the multiple drawing commands into at least one first-class drawing command and at least one second-class drawing command, the irregular drawing command referring to a drawing command corresponding to a drawing area of an irregular shape, the irregular shape refers to all shapes except a regular shape and the regular shape refers to a rectangle whose edges are in parallel with edges corresponding to a display desktop, a drawing area of the at least one first-class drawing command being a rectangle in a drawing area corresponding to the irregular drawing command, a drawing area of the at least one second-class drawing command being a remaining corner area obtained after the drawing area of the at least one first-class drawing command is subtracted from the drawing area corresponding to the irregular drawing command, a drawing mode of the at least one first-class drawing command being the same as a drawing mode of the irregular drawing command, and a drawing mode of the at least one second-class drawing command being the wait mode;

group, into multiple drawing command sets according to the bounding rectangle information and the drawing area information, a regular drawing command in the multiple drawing commands, and the at least one first-class drawing command and the at least one second-class drawing command that are obtained after the irregular drawing command in the multiple drawing commands is split, so that drawing commands that belong to different drawing command sets do not intersect with each other;

separately perform intersection detection on the multiple drawing command sets according to the bounding rectangle information and the drawing area information, so that drawing commands in each drawing command set in the multiple drawing command sets do not intersect with each other;

separately perform, according to the execution content, the drawing mode, and the drawing area information, a drawing command combining on the multiple drawing command sets on which the intersection detection is performed; and execute the drawing command obtained after combining is performed on each drawing command set.

8. The graphics processing apparatus according to claim 7, the processor is further configured to:

acquire maximum inscribed rectangle information of the irregular drawing command according to bounding rectangle information and drawing area information of the irregular drawing command; and split the irregular drawing command into the one first-class drawing command and the at least one second-class drawing command using the bounding rectangle information and the maximum inscribed rectangle information of the irregular drawing command, the drawing area corresponding to the first-class drawing command being a maximum inscribed rectangle corresponding to the irregular drawing command, and the drawing area corresponding to the at least one second-class drawing command being a corner area obtained after the maximum inscribed rectangle is subtracted from the drawing area corresponding to the irregular drawing command.

9. The graphics processing apparatus according to claim 7, the processor is further configured to:

segment a drawing area of an irregular polygon into multiple triangular drawing areas when the drawing area corresponding to the irregular drawing command is the irregular polygon;

split the irregular drawing command into multiple third-class drawing commands according to a segmentation method of the irregular polygon, the multiple third-class drawing commands being in one-to-one correspondence with the multiple triangular drawing areas;

acquire, for each third-class drawing command, maximum inscribed rectangle information of the third-class drawing command according to bounding rectangle information and drawing area information of the third-class drawing command; and split the third-class drawing command into the one first-class drawing command and the at least one second-class drawing command using the bounding rectangle information and the maximum inscribed rectangle information of the third-class drawing command, the drawing area corresponding to the first-class drawing command being a maximum inscribed rectangle corresponding to the third-class drawing command, and the drawing area corresponding to the at least one second-class drawing command being a corner area obtained after the maximum inscribed rectangle is subtracted from a drawing area corresponding to the third-class drawing command.

10. The graphics processing apparatus according to claim 7, wherein the graphics processing apparatus is communicatively connected to a graphics display apparatus, the graphics display apparatus being configured to display a graph obtained after the graphics processing apparatus executes a combined drawing command.

11. A graphics processing apparatus, comprising:

a memory storing executable instructions; and a processor coupled to the memory and configured to:

receive a command queue for a current frame, the command queue comprising multiple application programming interface (API) commands;

convert the multiple API commands to multiple drawing commands, each drawing command carrying bounding rectangle information, execution content, a drawing mode, and drawing area information, and the drawing mode comprising an opaque mode, a blend mode, or a wait mode;

split, according to the bounding rectangle information and the drawing area information, each irregular drawing command in the multiple drawing commands into at least one first-class drawing command and at least one second-class drawing command, the irregular drawing command referring to a drawing command corresponding to a drawing area of an irregular shape, the irregular shape refers to all shapes except a regular shape and the regular shape refers to a rectangle whose edges are in parallel with edges corresponding to a display desktop, a drawing area of the at least one first-class drawing command being a rectangle in a drawing area corresponding to the irregular drawing command, a drawing area of the at least one second-class drawing command being a remaining corner area obtained after the drawing area of the at least one first-class drawing command is subtracted from the drawing area corresponding to the irregular drawing command, a drawing mode of the at least one first-class drawing command being the same as a drawing mode of the irregular drawing command, and a drawing mode of the at least one second-class drawing command being the wait mode;

group, into multiple drawing command sets according to the bounding rectangle information and the drawing area information, a regular drawing command in the multiple drawing commands, the at least one first-class drawing command and the at least one second-class drawing command that are obtained after the irregular drawing command in the multiple drawing commands is split being split, so that drawing commands that belong to different drawing command sets do not intersect with each other;

separately perform intersection detection on the multiple drawing command sets according to the bounding rectangle information and the drawing area information, so that drawing commands in each drawing command set in the multiple drawing command sets do not intersect with each other;

separately perform, according to the execution content, the drawing mode, and the drawing area information, a drawing command combining on the multiple drawing command sets on which the intersection detection is performed; and execute the drawing command obtained after combining is performed on each drawing command set.

12. The graphics processing apparatus according to claim 11, the processor is further configured to:

acquire maximum inscribed rectangle information of the irregular drawing command according to bounding rectangle information and drawing area information of the irregular drawing command; and split the irregular drawing command into the one first-class drawing command and the at least one second-class drawing command using the bounding rectangle information and the maximum inscribed rectangle information of the irregular drawing command, the drawing area corresponding to the first-class drawing command being a maximum inscribed rectangle corresponding to the irregular drawing command, and the drawing area corresponding to the at least one second-class drawing command being a corner area obtained after the maximum inscribed rectangle is subtracted from the drawing area corresponding to the irregular drawing command.

13. The graphics processing apparatus according to claim 11, the processor is further configured to:

segment a drawing area of an irregular polygon into multiple triangular drawing areas when the drawing area corresponding to the irregular drawing command is the irregular polygon split the irregular drawing command into multiple third-class drawing commands according to a segmentation method of the irregular polygon, the multiple third-class drawing commands being in one-to-one correspondence with the multiple triangular drawing areas;

acquire, for each third-class drawing command, maximum inscribed rectangle information of the third-class drawing command according to bounding rectangle information and drawing area information of the third-class drawing command; and split the third-class drawing command into the one first-class drawing command and the at least one second-class drawing command using the bounding rectangle information and the maximum inscribed rectangle information of the third-class drawing command, the drawing area corresponding to the first-class drawing command being a maximum inscribed rectangle corresponding to the third-class drawing command, and the drawing area corresponding to the at least one second-class drawing command being a corner area obtained after the maximum inscribed rectangle is subtracted from a drawing area corresponding to the third-class drawing command.

14. The graphics processing apparatus according to claim 11, wherein the graphics processing apparatus is communicatively connected to a graphics display apparatus, the graphics display apparatus being configured to display a graph obtained after the graphics processing apparatus executes a combined drawing command.

\* \* \* \* \*

UNITED STATES PATENT AND TRADEMARK OFFICE
CERTIFICATE OF CORRECTION

PATENT NO. : 10,198,785 B2
APPLICATION NO. : 15/719073
DATED : February 5, 2019
INVENTOR(S) : Xiaotang Jiang, Zhenkun Zhou and Yunxi Li Page 1 of 1

It is certified that error appears in the above-identified patent and that said Letters Patent is hereby corrected as shown below:

On the Title Page

Item (30), Line 1: "201510154809" should read "201510154809.4"

Page (2), Item (56), OTHER PUBLICATIONS, Line 17: "fiction" should read "Action"

In the Claims

Column 47, Line 52: "7, the processor" should read "7, wherein the processor"

Column 48, Line 5: "7, the processor" should read "7, wherein the processor"

Column 49, Line 15: delete "is split"

Column 49, Line 32: "11, the processor" should read "11, wherein the processor"

Column 50, Line 8: "11, the processor" should read "11, wherein the processor"

Signed and Sealed this
Ninth Day of April, 2019

Andrei Iancu
*Director of the United States Patent and Trademark Office*